(12) United States Patent
Yoshimi et al.

(10) Patent No.: US 8,388,788 B2
(45) Date of Patent: Mar. 5, 2013

(54) METHOD OF WINDING HOLDING SEALING MATERIAL AND METHOD OF MANUFACTURING EXHAUST GAS PURIFYING APPARATUS

(75) Inventors: Mitsunori Yoshimi, Takahama (JP); Masayuki Eguchi, Takahama (JP); Yasuhiro Tsuchimoto, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 302 days.

(21) Appl. No.: 12/726,349

(22) Filed: Mar. 18, 2010

(65) Prior Publication Data
US 2010/0236697 A1  Sep. 23, 2010

(30) Foreign Application Priority Data

Mar. 23, 2009  (JP) ................................ 2009-070767

(51) Int. Cl.
*B65H 81/00* (2006.01)
(52) U.S. Cl. ........ 156/188; 156/184; 156/185; 156/187; 156/190; 156/195; 156/293; 156/294
(58) Field of Classification Search .................. 156/184, 156/185, 187, 188, 190, 195, 293, 294
See application file for complete search history.

(56) References Cited

U.S. PATENT DOCUMENTS

| | | | | |
|---|---|---|---|---|
| 2003/0104189 A1* | 6/2003 | Agata | ............................ | 428/219 |
| 2007/0014707 A1 | 1/2007 | Schultz et al. | | |
| 2007/0048196 A1 | 3/2007 | Takeuchi | | |
| 2010/0239469 A1* | 9/2010 | Olivier et al. | ................. | 422/180 |

FOREIGN PATENT DOCUMENTS

| | | | |
|---|---|---|---|
| DE | 102004056804 | * | 6/2006 |
| EP | 1342888 B1 | | 9/2003 |
| EP | 2067950 | | 6/2009 |
| EP | 2067950 A2 | * | 6/2009 |
| JP | 2007-92553 | * | 4/2007 |

OTHER PUBLICATIONS

Extended European Search Report for corresponding EP Application No. 10157320.2, Jun. 8, 2010.
The Notice of Opposition to corresponding EP Patent No. 2239433, Jun. 12, 2012.

* cited by examiner

*Primary Examiner* — Khanh P Nguyen
*Assistant Examiner* — Carson Gross
(74) *Attorney, Agent, or Firm* — Ditthavong Mori & Steiner, P.C.

(57) ABSTRACT

A method of winding a holding sealing material includes providing a mat-shaped holding sealing material including inorganic fibers. An exhaust gas treating body is provided having cell walls extending along a longitudinal direction of the exhaust gas treating body to define cells. The mat-shaped holding sealing material is wound around an outer peripheral portion of the exhaust gas treating body to form multiple layers including a first layer and a second layer wound around the first layer. Each of the multiple layers is shifted along the longitudinal direction in a winding order such that the first layer is placed closer to one end face of the exhaust gas treating body than the second layer. A shift between the first layer and the second layer is from about 0.15% to about 15% of a length in a width direction of the holding sealing material.

33 Claims, 11 Drawing Sheets

D-D line cross-sectional view

METHOD OF WINDING HOLDING SEALING MATERIAL AND METHOD OF MANUFACTURING EXHAUST GAS PURIFYING APPARATUS

CROSS-REFERENCE TO RELATED APPLICATIONS

The present application claims priority under 35 U.S.C. §119 to Japanese Patent Application No. 2009-070767 filed on Mar. 23, 2009, the contents of which are incorporated herein by reference in their entirety.

BACKGROUND OF THE INVENTION

1. Field of the Invention

The present invention relates to a method of winding a holding sealing material and a method of manufacturing an exhaust gas purifying apparatus.

2. Discussion of the Background

Exhaust gases discharged from internal combustion engines such as diesel engines contain particulate matters (hereinafter, also referred to as PMs), and in recent years, it has become a serious problem that these PMs are harmful to the environment and the human bodies. Exhaust gases also contain toxic gas components such as CO, HC, and NOx, and it has also become a problem that these toxic gas components are harmful to the environment and the human bodies.

In view of these problems, various exhaust gas purifying apparatuses have been proposed as an exhaust gas purifying apparatus which, when connected to an internal combustion engine, collects PMs in exhaust gases and purifies the toxic gas components such as CO, EC, NOx and the like contained in the exhaust gases. Those exhaust gas purifying apparatuses include an exhaust gas treating body made of porous ceramics such as cordierite and silicon carbide; a casing configured to accommodate the exhaust gas treating body therein; and a mat-shaped holding sealing material which contains inorganic fibers and is disposed between the exhaust gas treating body and the casing.

In the exhaust gas purifying apparatus, the holding sealing material holds the exhaust gas treating body by virtue of the elasticity which the inorganic fibers have. Further, the leakage of exhaust gases from a gap between the exhaust gas treating body and the casing is prevented by filling the gap with the holding sealing material.

One known conventional method of manufacturing an exhaust gas purifying apparatus is a method of winding the holding sealing material onto the outer peripheral portion of the exhaust gas treating body, and then press-fitting the exhaust gas treating body with the holding sealing material wound therearound into a casing. Hereinafter, this method will be described in detail with reference to drawings.

FIG. 1A is a perspective view schematically illustrating a conventional method of winding a holding sealing material. FIG. 1B is a perspective view schematically illustrating a conventional method of manufacturing an exhaust gas purifying apparatus which adopts the method of winding a holding sealing material illustrated in FIG. 1A. FIG. 1C is a perspective view schematically illustrating an exhaust gas purifying apparatus manufactured by the conventional method of manufacturing an exhaust gas purifying apparatus illustrated in FIG. 1B.

First, a mat-shaped holding sealing material 210 having a rectangular shape in a plan view is prepared as a holding sealing material. Then, as illustrated in FIG. 1A, the holding sealing material 210 is wound onto the outer peripheral portion of a round pillar-shaped exhaust gas treating body 230 such that side faces 211a and 211b, each including a shorter side (hereinafter, also simply referred to as shorter side face) of the holding sealing material 210, abut on each other. Hereinafter, the exhaust gas treating body 230 with the holding sealing material 210 wound therearound is also referred to as a wound body 240.

Next, as illustrated in FIG. 1B, an exhaust gas purifying apparatus 220 illustrated in FIG. 1C is manufactured by press-fitting the wound body 240 into a casing 250 having an inner diameter slightly shorter than the outer diameter of the wound body 240 (the total length of the diameter of the exhaust gas treating body 230 and the thickness of the holding sealing material 210).

In the exhaust gas purifying apparatus 220 thus manufactured, the holding sealing material 210 is compressed in the casing 250. Therefore, the holding sealing material 210 exerts a restoring force (i.e., a holding force to hold the exhaust gas treating body) to restore the original configuration due to the elasticity which the inorganic fibers have, whereby the exhaust gas treating body 230 is held by the holding sealing material 210.

However, in the exhaust gas purifying apparatus 220 manufactured by the conventional method, there is a problem that side faces 212a and 212b, each including a longer side (hereinafter, also simply referred to as longer side face) and being positioned at each end portion of the exhaust gas purifying apparatus 220, are deformed and thus the holding sealing material 210 is damaged when exhaust gases flow into the exhaust gas treating body.

This problem will be described below in detail with reference to drawings.

FIG. 2 is a cross-sectional view taken along the line E-E of the conventional exhaust gas purifying apparatus illustrated in FIG. 1C.

In FIG. 2, the press-fitting direction of the wound body is indicated by an arrow Y.

As illustrated in FIG. 2, the vicinity of a main face 213b (hereinafter, also simply referred to as second main face) of the holding sealing material 210, which is in contact with the casing 250, is deformed toward the reverse direction of the press-fitting direction. Thereby, at an end portion 220a of the exhaust gas treating body 220 on a side where the exhaust gas treating body is press-fitted, the longer side face 212a is projected from an end face 230a of the exhaust gas treating body 230. Further, at the opposite end portion 220b of the exhaust gas treating body 220, the longer side face 212b is depressed below an end face 230b of the exhaust gas treating body 230.

The reason for this is that when the wound body 240 is press-fitted into the casing 250, a shear force is applied between a main face 213a (hereinafter, also simply referred to as first main face) of the holding sealing material 210, which is in contact with the exhaust gas treating body 230, and the second main face 213b. This sheer force shifts the second main face 213b off the position of the first main face 213a to deform the holding sealing material.

As described above, at the end portions 220a, 220b of the exhaust gas purifying apparatus 220, the longer side faces 212a, 212b of the holding sealing material 210 are not substantially parallel to the end faces 230a, 230b of the exhaust gas treating body 230, and thus the longer side faces 212a, 212b are inclined relative to the end faces 230a, 230b.

The term "substantially parallel" used herein means that the longer side face of the holding sealing material is parallel to the end face of the exhaust gas treating body or that the longer side face is inclined relative to the end face to an extent that its inclination is effectively negligible.

Moreover, when exhaust gases flow into the exhaust gas treating body in a state where an end face of the wound body 240 is inclined, an area of contact between the longer side faces 212a, 212b and the exhaust gases is increased and therefore the longer side faces 212a, 212b are vulnerable to wind erosion caused by the flowing exhaust gases. The holding sealing material 210 may sometimes be damaged due to development of such wind erosion occurring in the longer side faces 212a, 212b.

This leads to a problem that the exhaust gases are leaked from a gap generated due to the wind erosion, or in some cases, the exhaust gas treating body 230 comes off because the exhaust gas treating body 230 cannot be sufficiently maintained when the holding sealing material 210 is damaged.

In view of these problems, Japanese Patent Application Publication (KOKAI) No. 2007-092553 for example discloses a method of winding a holding sealing material and a method of manufacturing an exhaust gas purifying apparatus, which use a holding sealing material with an inclined longer side face.

The contents of Japanese Patent Application Publication (KOKAI) No. 2007-092553 are incorporated herein by reference in their entirety.

SUMMARY OF TEE INVENTION

According to one aspect of the present invention, a method of winding a holding sealing material includes providing a mat-shaped holding sealing material including inorganic fibers. An exhaust gas treating body is provided having cell walls extending along a longitudinal direction of the exhaust gas treating body to define cells. The mat-shaped holding sealing material is wound around an outer peripheral portion of the exhaust gas treating body to form multiple layers including a first layer and a second layer wound around the first layer to contact the first layer. Each of the multiple layers is shifted along the longitudinal direction in a winding order such that the first layer of the multiple layers is placed closer to one end face of the exhaust gas treating body than the second layer of the multiple layers. A shift between the first layer and the second layer is from about 0.15% to about 15% of a length in a width direction of the holding sealing material.

According to another aspect of the present invention, a method of manufacturing an exhaust gas purifying apparatus includes providing a mat-shaped holding sealing material including inorganic fibers. An exhaust gas treating body is provided having cell walls extending along a longitudinal direction of the exhaust gas treating body to define cells. The mat-shaped holding sealing material is wound around an outer peripheral portion of the exhaust gas treating body to form multiple layers including a first layer and a second layer wound around the first layer to contact the first layer. Each of the multiple layers is shifted along the longitudinal direction in a winding order such that the first layer of the multiple layers is placed closer to one end face of the exhaust gas treating body than the second layer of the multiple layers. A shift between the first layer and the second layer is from about 0.15% to about 15% of a length in a width direction of the holding sealing material. The exhaust gas treating body with the holding sealing material wound around the exhaust gas treating body is press-connected into a casing, from an end face of the exhaust gas treating body on an opposite side of an inner layer exposed end face where a part of an innermost layer of the holding sealing material is exposed.

DESCRIPTION OF THE EMBODIMENTS

Figure 1A:
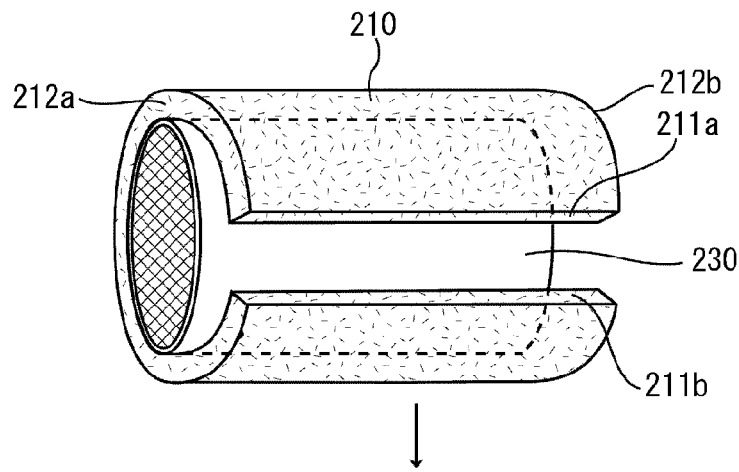
FIG. 1A is a perspective view schematically illustrating a conventional method of winding a holding sealing material.
Figure 1B:
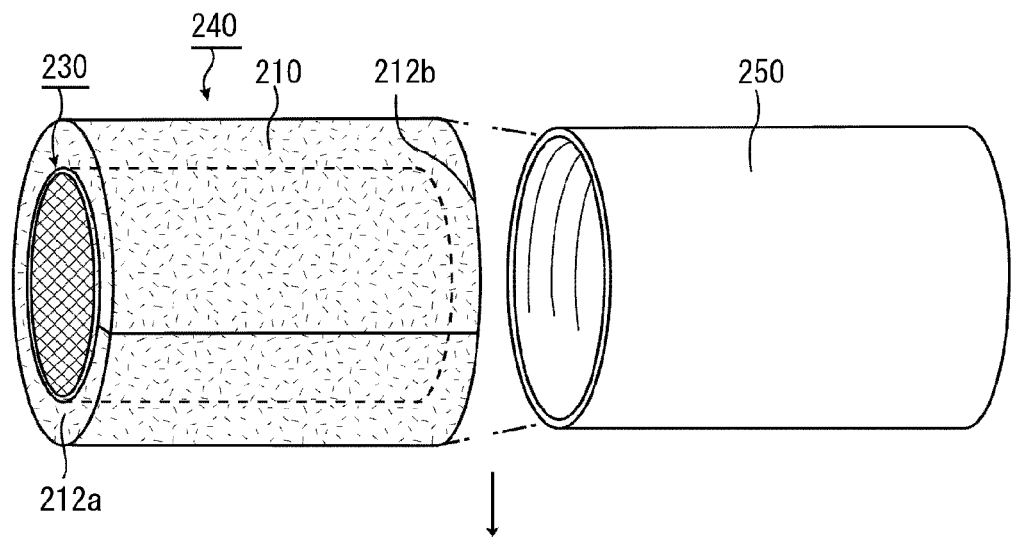
FIG. 1B is a perspective view schematically illustrating a conventional method of manufacturing an exhaust gas purifying apparatus with use of the method of winding a holding sealing material illustrated in FIG. 1A.
Figure 1C:
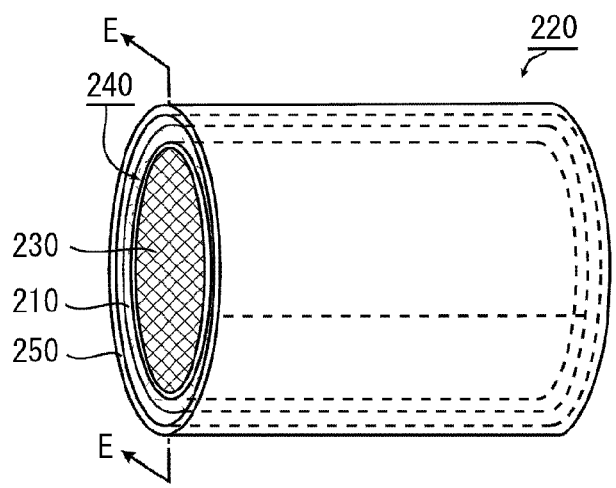
FIG. 1C is a perspective view schematically illustrating an exhaust gas purifying apparatus manufactured by the conventional method of manufacturing an exhaust gas purifying apparatus illustrated in FIG. 1B.
Figure 2:
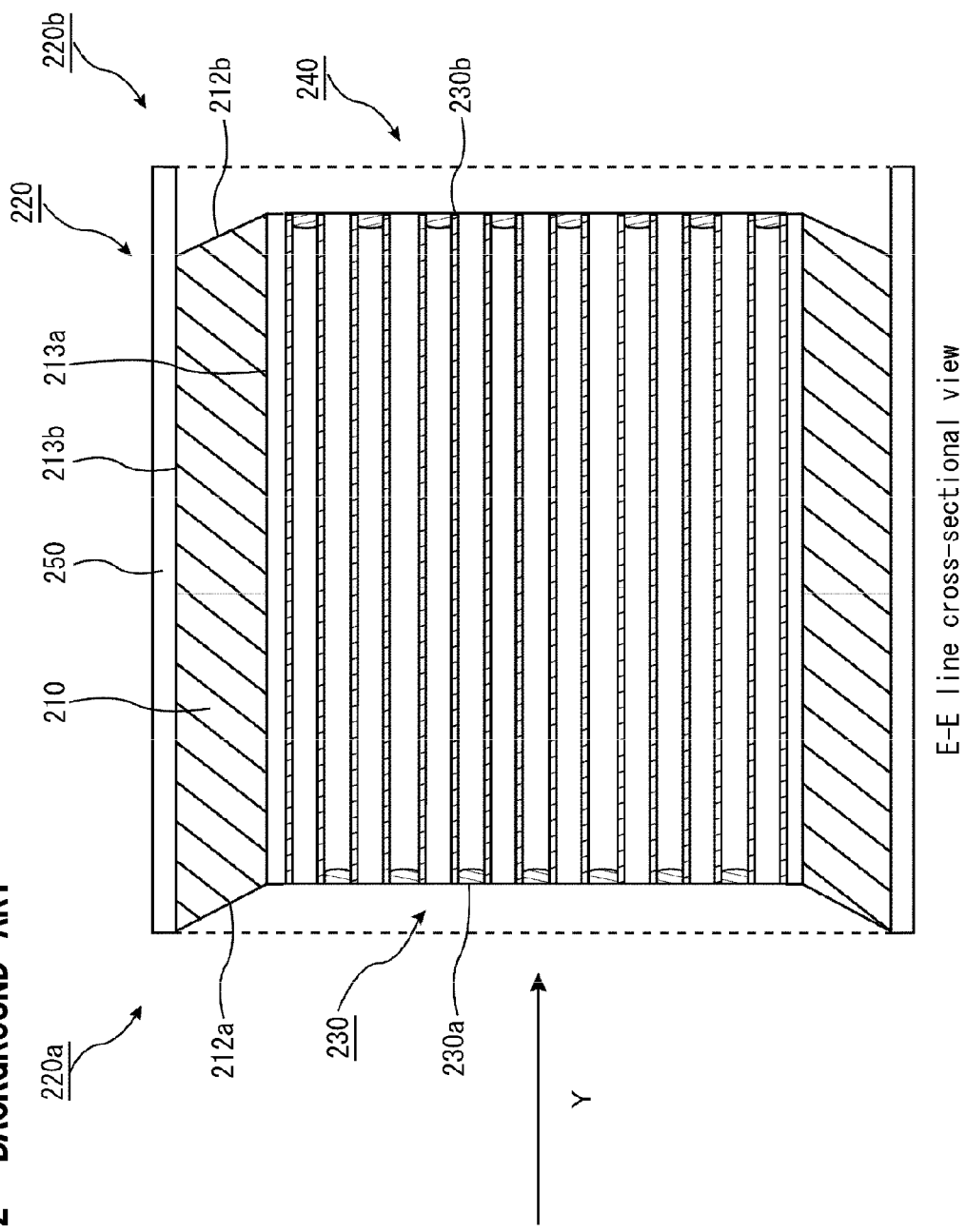
FIG. 2 is an E-E line cross-sectional view of the conventional exhaust gas purifying apparatus illustrated in FIG. 1C.

In the method of winding a holding sealing material described in Japanese Patent Application Publication (KO- KAI) No. 2007-092553, first, a longer side face of a holding sealing material is cut with a cutting jig such as a cutter to form an inclined face which is inclined from the first main face toward the second main face. Next, the holding sealing material is wound in a single layer around the outer peripheral portion of an exhaust gas treating body such that the longer side face (inclined face) of the holding sealing material is projected toward the press-fitting direction along which a wound body is to be press-fitted into a casing, whereby a wound body is manufactured.

Japanese Patent Application Publication (KOKAI) No. 2007-092553 describes that, when the wound body thus manufactured is press-fitted into the casing, the inclined face becomes gradually parallel to the end face of the exhaust gas treating body as the vicinity of the second main face is deformed toward the reverse direction of the press-fitting direction. Then, when the wound body is located at a predetermined position, the inclined face is substantially parallel to the end face of the exhaust gas treating body.

However, in the method of winding a holding sealing material described in Japanese Patent Application Publication (KOKAI) No. 2007-092553, the longer side face of the holding sealing material is cut at an angle with a cutting jig such as a cutter, whereby an inclined face is formed. The area of such a mechanically cut surface of inorganic fibers tends to increase at the inclined face, and wind erosion resistance of the inclined face tends to be deteriorated compared with other faces.

Consequently, in the manufactured exhaust gas purifying apparatus, wind erosion of the longer side face due to contact with exhaust gases is less likely be sufficiently prevented, and the holding sealing material may sometimes be damaged.

Further, in order that the end face of the exhaust gas treating body and the longer side face of the holding sealing material becomes substantially parallel to each other, it is assumed that the method of winding a holding sealing material described in Japanese Patent Application Publication (KOKAI) No. 2007-092553 requires adjustment of the angle, the shape, or the like of the inclined face according to the sizes of the exhaust gas treating body and the holding sealing material wound in a single layer when the holding sealing material is wound. Further, it is considered that a cutting jig such as a cutter is needed in order to adjust the angle, the shape, or the like of the inclined face.

It is considered that this results in a reduction in production efficiency and consequently an increase in production cost.

Accordingly, a method of winding a holding sealing material and a method of manufacturing an exhaust gas purifying apparatus have been desired which enable at a low cost the manufacturing of an exhaust gas purifying apparatus having a holding sealing material resistant to damage.

The present inventors have made more investigations to solve the above problems and completed a holding sealing material according to the embodiment of the present invention.

That is, the method of winding a holding sealing material according to the embodiment of the present invention includes winding in multiple layers a mat-shaped holding sealing material including inorganic fibers around an outer peripheral portion of an exhaust gas treating body that has a plurality of cells placed longitudinally in parallel with one another with a cell wall interposed therebetween, wherein each layer of the holding sealing material on the exhaust gas treating body is shifted in the winding order such that an outer layer of the holding sealing material is placed closer to one end face of the exhaust gas treating body than an inner layer of the holding sealing material, and that a shift between each inner layer and the adjacent outer layer is from about 0.15% to about 15% of a length in a width direction of the holding sealing material.

In an exhaust gas purifying apparatus manufactured by the method of winding a holding sealing material according to the embodiment of the present invention, a longer side face of each layer of the holding sealing material and an end face of the exhaust gas treating body tend to be substantially parallel to each other and an area of contact between the longer side face and exhaust gases tends to be decreased. Hence, the longer side face tends to be resistant to wind erosion.

Further, the method of winding a holding sealing material according to the embodiment of the present invention does not include cutting the longer side face of the holding sealing material so as to form an inclined face with a cutting jig such as a cutter. An exhaust gas purifying apparatus manufactured by this method therefore tends to have a small area of a cut surface of inorganic fibers at the longer side face of the holding sealing material. This also tends to allow the longer side face to be resistant to wind erosion.

As described above, an exhaust gas purifying apparatus manufactured with use of the method of winding a holding sealing material according to the embodiment of the present invention tends to have the longer side face of the holding sealing material resistant to wind erosion and thus tends to have the holding sealing material resistant to damage.

Moreover, the method eliminates the need for cutting to adjust an angle or a shape of the inclined face in accordance with the sizes of the exhaust gas treating body and the holding sealing material, thereby eliminating the need for a cutting jig such as a cutter.

Accordingly, manufacturing of an exhaust gas purifying apparatus with use of the method of winding a holding sealing material according to the embodiment of the present invention tends to lead to an increase in production efficiency and low manufactured cost.

Specific examples of the method of winding a holding sealing material according to the embodiment of the present invention include a after-mentioned method of spirally winding around the exhaust gas treating body the holding sealing material having a length sufficiently longer than the outer periphery of the exhaust gas treating body; and a after-mentioned method of sequentially winding around the exhaust gas treating body a plurality of small holding sealing materials separated from each other.

In the method of winding a holding sealing material according to the embodiment of the present invention, the holding sealing material is desirably spirally wound around the exhaust gas treating body.

The method of winding a holding sealing material will be described below with reference to drawings.

Here, consider a case where the holding sealing material is a mat-shaped holding sealing material having a rectangular shape in a plan view, the exhaust gas treating body is a round pillar-shaped exhaust gas treating body, and the holding sealing material is to be spirally wound around the exhaust gas treating body by the method of winding a holding sealing material according to the embodiment of the present invention. Note that the details of the exhaust gas treating body will be described in a later-described first embodiment.

Figure 3A:
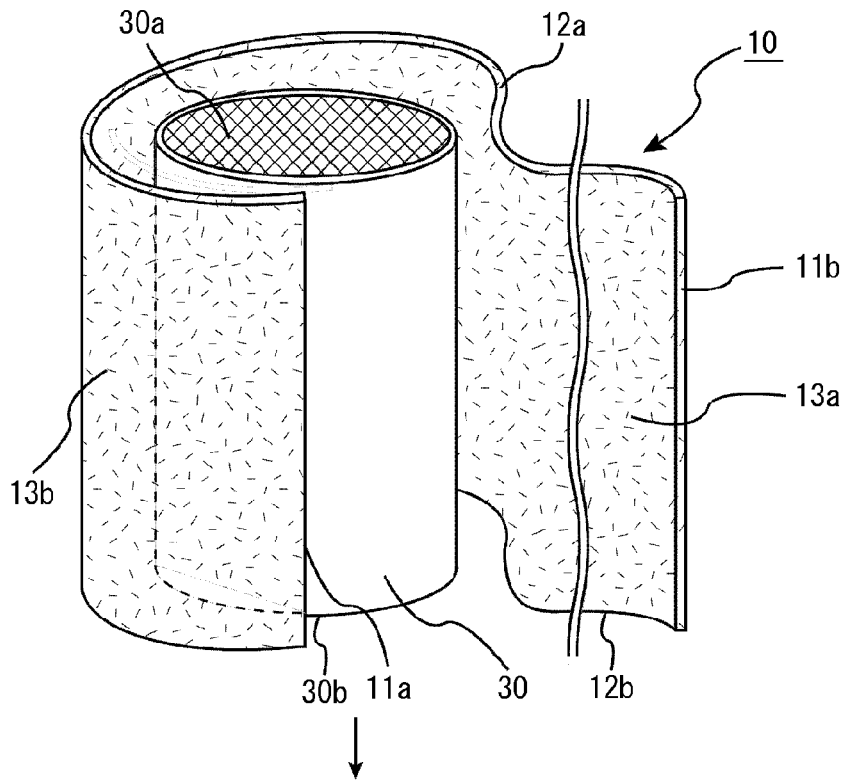
FIG. 3A is a perspective view schematically illustrating a holding sealing material and an exhaust gas treating body before winding.
Figure 3B:
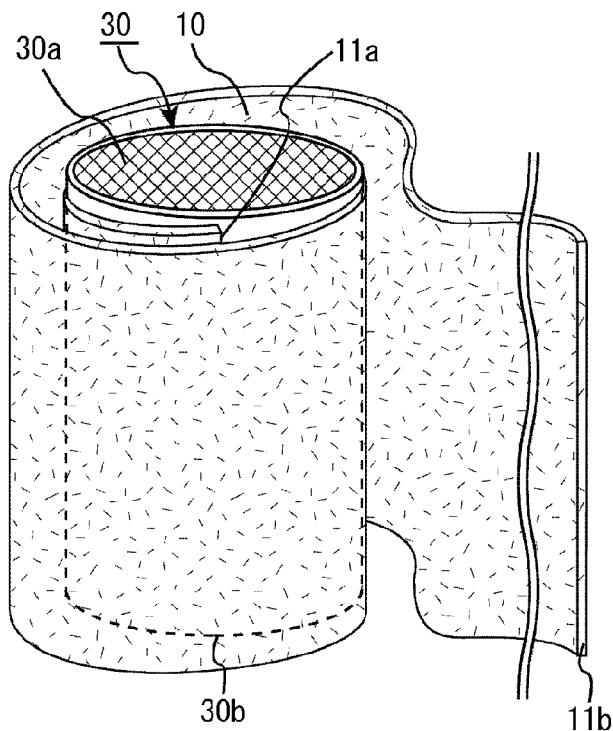
FIG. 3B is a perspective view schematically illustrating a state where the holding sealing material is wound once around the outer peripheral portion of the exhaust gas treating body.

FIG. 3A is a perspective view schematically illustrating a holding sealing material and an exhaust gas treating body before winding. FIG. 3B is a perspective view schematically illustrating a state where the holding sealing material is wound once around the outer peripheral portion of the exhaust gas treating body.

First, a mat-shaped holding sealing material is prepared which contains inorganic fibers and has a rectangular shape in a plan view.

Then, as illustrated in FIG. 3A, an end portion on a shorter side face 11a of a holding sealing material 10 is abutted on the outer peripheral portion of an exhaust gas treating body 30 with a first main face 13a of the holding sealing material 10 directed inward (exhaust gas treating body 30 side) and with a second main face 13b directed outward (casing side).

Next, as illustrated in FIG. 3B, the end portion on the shorter side face 11a, which is abutted on the exhaust gas treating body 30, is fixed, and the opposite end portion on a shorter side face 11b is moved along the outer peripheral portion of the exhaust gas treating body 30, whereby the holding sealing material 10 is wound once on the outer peripheral portion of the exhaust gas treating body 30. In FIG. 3B, the holding sealing material 10 is wound clockwise.

Figure 4:
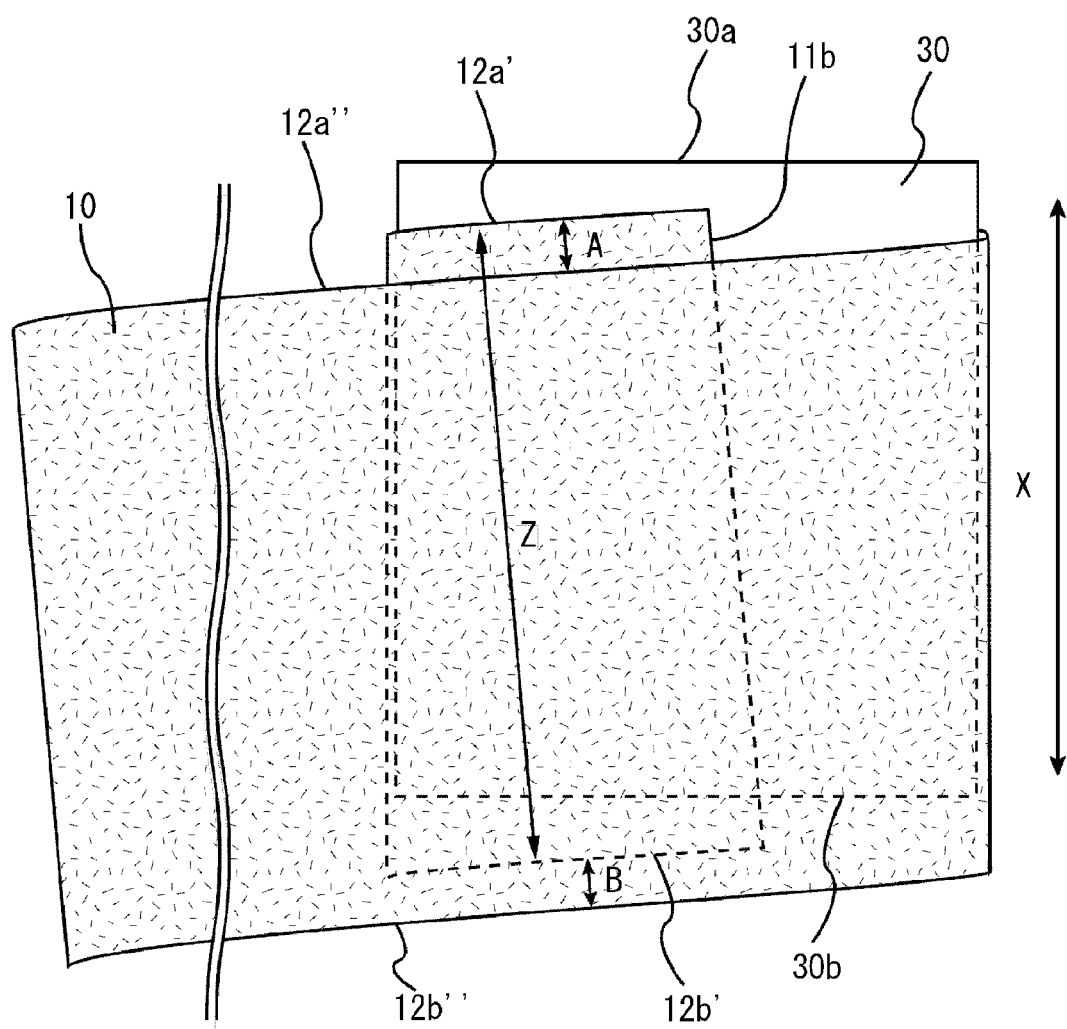
FIG. 4 is a partially perspective plan view schematically illustrating the exhaust gas treating body with the holding sealing material wound therearound of FIG. 3B which is seen from a direction perpendicular to the longitudinal direction of the exhaust gas treating body.

At this time, as illustrated in FIG. 4, the holding sealing material is spirally wound around the exhaust gas treating body by shifting the holding sealing material 10 gradually toward an end face 30b on the opposite side of an inner layer exposed end face 30a where a part of an innermost layer of the holding sealing material 10 is exposed, along the longitudinal direction of the exhaust gas treating body 30 (the direction indicated by a double-headed arrow X in FIG. 4). Here, the shortest distance between a longer side face 12a' (12b') of the holding sealing material 10, which is included in an inner layer, and a longer side face 12a'' (12b'') of the holding sealing material 10, which is included in an outer layer, i.e., a shift (hereinafter, also simply referred to as spiral pitch, and indicated by a double-headed arrow A or B in FIG. 4) is 0.15 to 15% of a length in the width direction (indicated by a double-headed arrow Z in FIG. 4) of the holding sealing material 10.

The width direction of the holding sealing material herein refers to the direction parallel to the shorter sides of the holding sealing material when the holding sealing material has a substantially rectangular shape (a rectangular shape or the substantially same shape as the rectangular shape, the same applies hereinafter) in a plan view; a direction parallel to any sides when the holding sealing material has a substantially square shape (a square shape or the substantially same shape as the square shape, the same applies hereinafter) in a plan view; or a height direction of the holding sealing material with the long side (any side if the shape in a plan view is a rhombus) taken as a base, when the holding sealing material has a substantially parallelogram shape (a parallelogram shape or the substantially same shape as the parallelogram shape, the same applies hereinafter) in a plan view.

Further, the later-described longitudinal direction of the holding sealing material refers to a direction perpendicular to the width direction of the holding sealing material.

FIG. 4 is a partially perspective plan view schematically illustrating the exhaust gas treating body with the holding sealing material wound therearound of FIG. 3B which is seen from a direction perpendicular to the longitudinal direction of the exhaust gas treating body.

By repeating the winding procedure described above, the holding sealing material 10 is spirally wound around the outer peripheral portion of the exhaust gas treating body 30 such that the spiral pitch between the respective longer side faces 12a (12a' (12b'), 12a'' (12b'') etc.) of each inner layer of the holding sealing material and the adjust outer layer of the holding sealing material on the outer side of the inner layer is from about 0.15% to about 15% of a length in the width direction of the holding sealing material 10.

Note that a portion of a holding sealing material, wound once around the outer peripheral portion of the exhaust gas treating body (or around a holding sealing material already wound around the outer peripheral portion of the exhaust gas treating body), refers to one layer herein. For example, in FIG. 5A, the holding sealing material 10 is wound three times, which means that the holding sealing material is wound in three layers.

A case of manufacturing an exhaust gas purifying apparatus with use of the method of winding a holding sealing material according to the embodiment of the present invention will be described below with reference to drawings.

Figure 5:
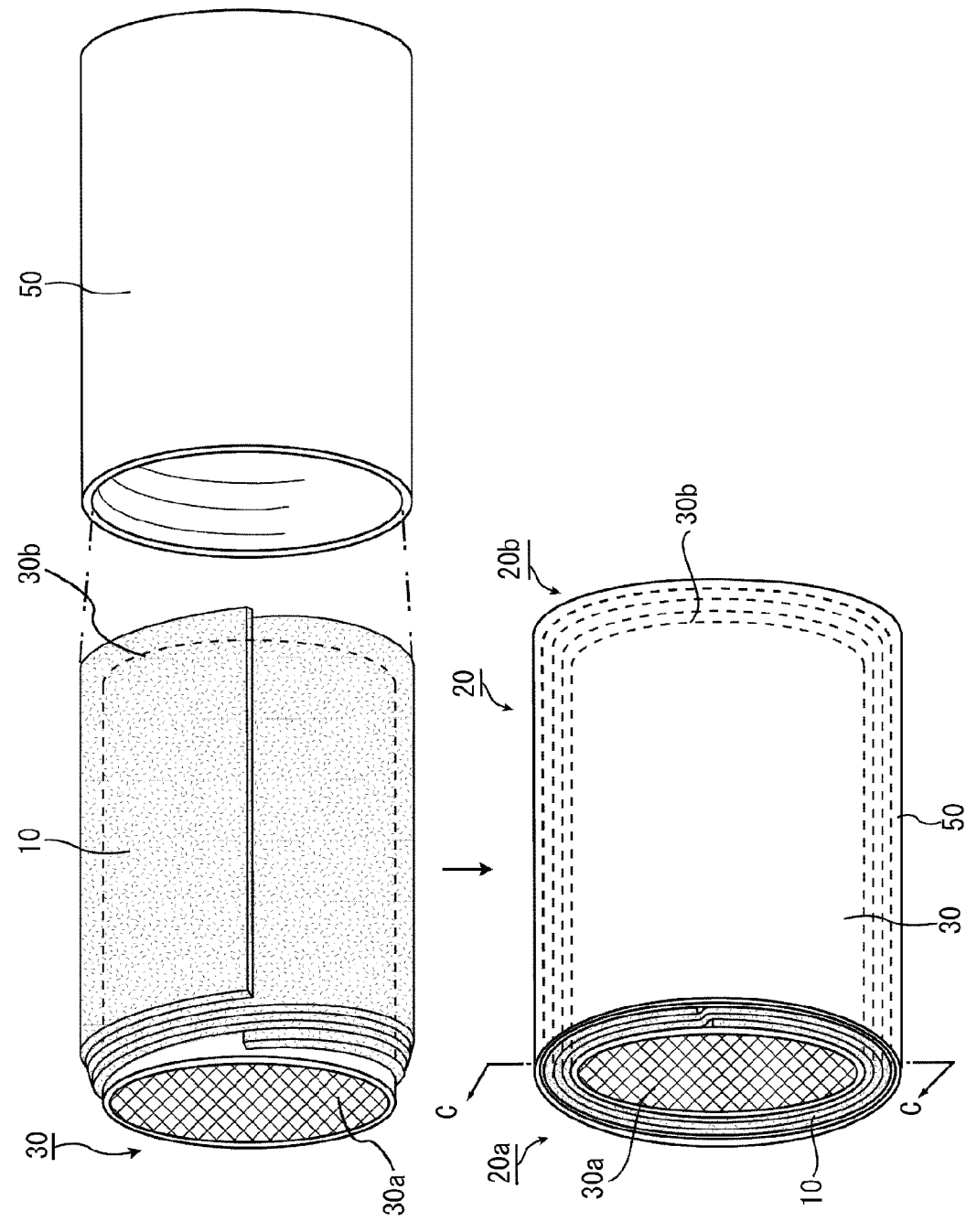
FIG. 5A is a perspective view schematically illustrating a process of press-fitting an exhaust gas treating body with a holding sealing material wound therearound into a casing, according to the embodiment of the present invention.
FIG. 5B is a perspective view schematically illustrating an exhaust gas purifying apparatus manufactured through the press-fitting process illustrated in FIG. 5A.

FIG. 5A is a perspective view schematically illustrating a process of press-fitting an exhaust gas treating body with a holding sealing material wound therearound into a casing, according to the embodiment of the present invention. FIG. 5B is a perspective view schematically illustrating an exhaust gas purifying apparatus manufactured through the press-fitting process illustrated in FIG. 5A.

When an exhaust gas purifying apparatus is manufactured with use of the method of winding a holding sealing material according to the embodiment of the present invention, the exhaust gas treating body 30 with the holding sealing material 10 wound therearound may be press-fitted into the casing 50 from the end face 30b of the exhaust gas treating body on the opposite side of the inner layer exposed end face 30a, as illustrated in FIG. 5A. Thereby, an exhaust gas purifying apparatus 20 illustrated in FIG. 5B is manufactured.

The exhaust gas purifying apparatus 20 illustrated in FIG. 5B will be described below with reference to drawings.

Figure 6:
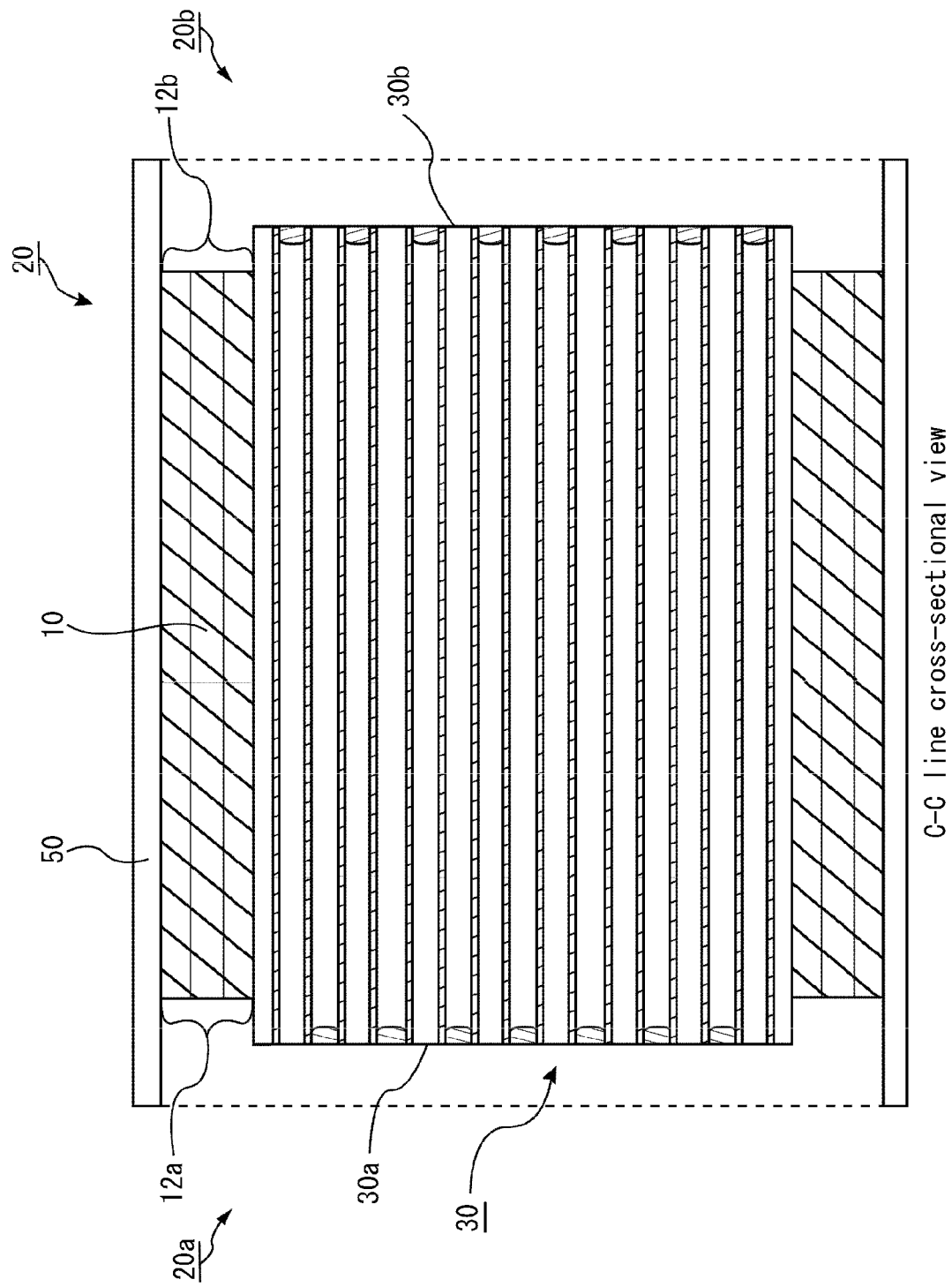
FIG. 6 is a C-C line cross-sectional view of the exhaust gas purifying apparatus according to the embodiment of the present invention, which is illustrated in FIG. 5B.

FIG. 6 is a C-C line cross-sectional view of the exhaust gas purifying apparatus according to the embodiment of the present invention, which is illustrated in FIG. 5B.

In FIG. 6, the holding sealing material 10 and the exhaust gas treating body 30 are disposed at respective predetermined locations within the casing 50 in the manufactured exhaust gas purifying apparatus 20. In this state, the longer side face 12a (12b) of each layer of the holding sealing material 10 and the end face 30a (30b) of the exhaust gas treating body 30 are substantially parallel to each other at both of a press-fitting side end portion 20a and an end portion 20b on the opposite side of the press-fitting side end portion 20a of the exhaust gas purifying apparatus 20.

This is considered to happen due to the following reason.

It is considered that as the exhaust gas treating body 30 with the holding sealing material 10 wound therearound is press-fitted into the casing 50, each layer of the spirally wound holding sealing material 10 is moved toward a direction opposite to the press-fitting direction by a shear force. It appears that particularly a larger shear force is applied to the outermost layer, and therefore the outermost layer may be moved by a large amount.

Here, the holding sealing material 10 is spirally wound around the exhaust gas treating body 30 at a spiral pitch of from about 0.15% to about 15% of a length in the width direction of the holding sealing material. When this exhaust gas treating body 30 is press-fitted into a casing, each layer of the holding sealing material 10 moves toward the opposite direction of the press-fitting direction. The movement distance of each layer of the holding sealing material 10 cancels out a spiral pitch (at the $n^{th}$ layer (n is 2 or more), the total pitch of the spiral pitches from the first layer to the $n^{th}$ layer), whereby the longer side face 12a (12b) of each layer of the holding sealing material 10 and the end face 30a (30b) of the exhaust gas treating body 30 are presumably substantially parallel to each other in the manufactured exhaust gas purifying apparatus 20.

However, when the spiral pitch is more than about 15% of a length in the width direction of the holding sealing material, the spiral pitch tends to be too large. Accordingly, it is considered that movement of each layer of the holding sealing material toward the opposite direction of the press-fitting direction tends to be insufficient to allow the longer side face of each layer of the holding sealing material to be substantially parallel to the end face of the exhaust gas treating body.

Further, when the spiral pitch is less than about 0.15% of a length in the width direction of the holding sealing material, it is considered that each layer of the holding sealing material tends to move excessively toward the opposite direction of the press-fitting direction, which tends not to allow the longer side face of each layer of the holding sealing material to be substantially parallel to the end face of the exhaust gas treating body.

As described above, use of the method of winding a holding sealing material according to the embodiment of the present invention in manufacturing of an exhaust gas purifying apparatus makes it easier for the manufactured exhaust gas purifying apparatus to have a longer side face of each layer of the holding sealing material and an end face of the exhaust gas treating body which are substantially parallel to each other. This tends to decrease the area of contact between the longer side face and exhaust gases, making the longer side face resistant to wind erosion.

Further, the method of winding a holding sealing material according to the embodiment of the present invention also eliminates the need for cutting the longer side face of the holding sealing material into an inclined face with a cutting jig such as a cutter, which tends to make the longer side face resistant to wind erosion. Further, since the cutting jig such as a cutter is unnecessary, production efficiency tends to be increased and an exhaust gas purifying apparatus tends to be manufactured at a low cost.

Furthermore, since the holding sealing material is wound in multiple layers around the exhaust gas treating body by performing an operation of winding spirally a long holding sealing material around the exhaust gas treating body only once, production efficiency of the exhaust gas treating body with the holding sealing material wound therearound (wound body) tends to be improved.

The method of winding a holding sealing material according to the embodiment of the present invention is desirably that, the holding sealing material, in a plan view, is a parallelogram with an acute angle $\alpha$ being about $70° \leq \alpha <$ about $90°$, and the holding sealing material is desirably wound around the exhaust gas treating body such that one side face of the holding sealing material is substantially parallel to a straight line drawn along a longitudinal direction of the exhaust gas treating body.

Further, the method of winding a holding sealing material according to the embodiment of the present invention is desirably that the acute angle $\alpha$ is about $85° \leq \alpha <$ about $90°$.

The method of winding a holding sealing material according to the embodiment of the present invention employs a holding sealing material having a parallelogram shape with an acute angle $\alpha$ of about $70° \leq \alpha <$ about $90°$ in a plan view. This holding sealing material is more likely to be wound at a spiral pitch corresponding to from about 0.15% to about 15% of a length in the width direction of the holding sealing material when wound with one side face being substantially parallel to a straight line drawn along the longitudinal direction of the exhaust gas treating body.

Accordingly, the holding sealing material is more likely to be spirally wound around the exhaust gas treating body easily and efficiently at a predetermined spiral pitch by only winding the holding sealing material with a shorter side face being substantially parallel to a straight line drawn along the longitudinal direction of the exhaust gas treating body, without adjusting the position of the holding sealing material before the holding sealing material is wound.

If the acute angle $\alpha$ is about $85° \leq \alpha <$ about $90°$, the holding sealing material is more likely to be spirally wound around the exhaust gas treating body easily and efficiently at a predetermined spiral pitch, as in the case where the acute angle $\alpha$ is about $70° \leq \alpha <$ about $90°$. In addition, when the holding sealing material is wound in multiple layers around the exhaust gas treating body, the holding sealing material hardly twists, and thus a gap is hardly generated between the holding sealing material and the exhaust gas treating body.

Therefore, a gap between the exhaust gas treating body and the casing tends to be completely filled with the holding sealing material in the exhaust gas purifying apparatus manufactured with use of the holding sealing material, and the leakage of exhaust gases tends not to occur.

On the other hand, if the acute angle $\alpha$ is less than about $85°$, the holding sealing material is more likely to need to be carefully wound around the exhaust gas treating body in order to prevent twist of the holding sealing material, which may possibly deteriorate production efficiency of a wound body.

The method of winding a holding sealing material according to the embodiment of the present invention is desirably that, the holding sealing material is wound around the exhaust gas treating body such that an acute angle $\beta$ is about $70° \leq \beta <$ about $90°$ in a projection view of the exhaust gas treating body and the holding sealing material projected from a direction perpendicular to the longitudinal direction of the exhaust gas treating body, the angle $\beta$ formed by a straight line drawn along the longitudinal direction of the exhaust gas treating body and a tangent line that is determined at an intersection of the straight line and a curve formed by a side face of the holding sealing material on one end face side of the exhaust gas treating body.

The method of winding a holding sealing material will be described with reference to the drawing, taking as an example a case where the above-mentioned holding sealing material containing inorganic fibers and having a rectangular mat shape in a plan view is used.

Figure 7:
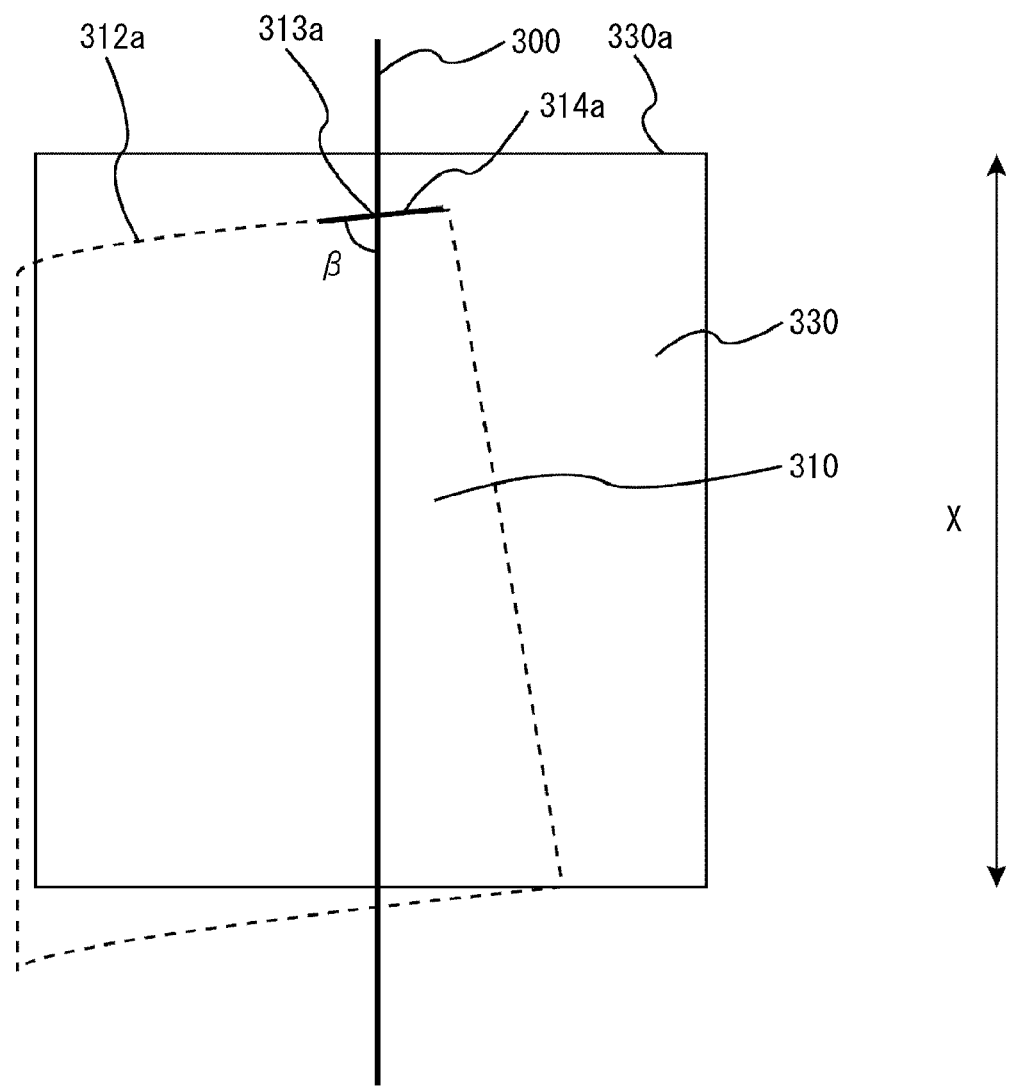
FIG. 7 is a projection view where an exhaust gas treating body and a holding sealing material, having one end portion abutted on the outer peripheral portion of the exhaust gas treating body, are projected from a direction perpendicular to the longitudinal direction of the exhaust gas treating body.

FIG. 7 is a projection view where an exhaust gas treating body and a holding sealing material, having one end portion abutted on the outer peripheral portion of the exhaust gas treating body, are projected from a direction perpendicular to the longitudinal direction of the exhaust gas treating body.

Note that the longitudinal direction of the exhaust gas treating body is indicated by a double-headed arrow X in FIG. 7.

First, similarly to the above-mentioned method of winding a holding sealing material, an end portion on a shorter side face side of the holding sealing material is abutted on the outer peripheral portion of the exhaust gas treating body with a first main face of the holding sealing material directed inward and with a second main face directed outward.

At this time, an end portion of the holding sealing material is abutted on the outer peripheral portion of the exhaust gas treating body such that an acute angle $\beta$ is about $70° \leq \beta <$ about $90°$ in the projection view illustrated in FIG. 7. The angle $\beta$ is formed, in the case that a holding sealing material 310 is wound around an exhaust gas treating body 330, by a straight line 300 drawn along the longitudinal direction of the exhaust gas treating body 330 and a tangent line 314a that is determined at an intersection 313a of the straight line 300 and a curve 312a formed by a side face of the holding sealing material 310 on one end face 330a side of the exhaust gas treating body 330.

Thereafter, the holding sealing material is wound around the exhaust gas treating body.

In the example illustrated in FIG. 7, the acute angle β is determined from the straight line 300 drawn to pass through the vicinity of the center portion of the exhaust gas treating body 330 and the tangent line 314a of the curve 312a at the intersection 313a. The straight line 300, however, does not always need to be drawn to pass through the center portion of the exhaust gas treating body 330. The intersection 313a may be determined at any position on the curve 312a and the acute angle β may be determined from the tangent line 314a of the curve 312a at the determined intersection 313a. At any intersection point 313a, the acute angle β is about 70°≦β<about 90°.

When the method of winding a holding sealing material according to the embodiment of the present invention is employed, the holding sealing material is more likely to be wound around the exhaust gas treating body such that the shift is from about 0.15% to about 15% of a length in the width direction of the holding sealing material.

Here, in winding the holding sealing material around the outer peripheral portion of the exhaust gas treating body, not only the end portion on a shorter side face side of the holding sealing material but also the vicinity of the center portion of the holding sealing material may be abutted on the periphery of the exhaust gas treating body.

The method of winding a holding sealing material according to the embodiment of the present invention is desirably that a region of the holding sealing material corresponding to at least one layer is a needled mat on which a needling treatment has been performed.

The holding sealing material including a needled mat tends to be resistant to wind erosion since inorganic fibers constituting the holding sealing material are complicatedly entangled.

Accordingly, an exhaust gas purifying apparatus manufactured with use of the method of winding a holding sealing material according to the embodiment of the present invention tends to have the holding sealing material resistant to damage.

Further, in the method of winding a holding sealing material according to the embodiment of the present invention, a region of the holding sealing material corresponding to at least one layer may be a ceramic fiber mat manufactured from a mixture containing inorganic fibers by a papermaking technique.

The method of winding a holding sealing material according to the embodiment of the present invention is desirably that, the holding sealing material includes a plurality of small holding sealing materials separated from one another.

When the holding sealing material includes a plurality of small holding sealing materials separated from one another, the position of each of the small holding sealing materials tends to be separately adjusted in winding the small holding sealing material around the exhaust gas treating body.

Accordingly, when the holding sealing material including a plurality of small holding sealing materials separated from one another is employed, it is easy to adjust the position of the holding sealing material so as to allow the shift to be a predetermined value, compared to a case where one sheet of holding sealing material is employed.

The method of winding a holding sealing material according to the embodiment of the present invention is desirably that, at least a small holding sealing material serving as the innermost layer and a small holding sealing material serving as the outermost layer have a plurality of needle marks formed by a needling treatment.

Further, the method of winding a holding sealing material according to the embodiment of the present invention is desirably that, the plurality of needle marks are formed along a longitudinal direction of the small holding sealing material.

When the method of winding a holding sealing material according to the embodiments of the present invention is employed, an amount of work to manufacture exhaust gas purifying apparatuses is more likely to be reduced and the small holding sealing materials and the exhaust gas treating body are more likely to be prevented from coming off the manufactured exhaust gas purifying apparatus. The reason for this will be described in a third embodiment described later.

In the method of winding a holding sealing material according to the embodiment of the present invention, the holding sealing material may include a plurality of small holding sealing materials bound to one another.

The method of winding a holding sealing material according to the embodiment of the present invention is desirably that, the shift is from about 0.1 mm to about 10 mm.

When the shift is from about 0.1 mm to about 10 mm, a shift of the holding sealing material in a wound body tends to be from about 0.1 mm to about 10 mm after the completion of winding of the holding sealing material.

If such a wound body is press-fitted into the casing from an end face on the opposite side of an inner layer exposed end face, each layer of the holding sealing material tends to move toward the reverse direction of the press-fitting direction, and the movement distance of each layer of the holding sealing material tends to be in good agreement with the shift of the layer (at the $n^{th}$ layer (n is 2 or more), the total shift of the shifts from the first layer to the $n^{th}$ layer). This tends to lead to a very small degree of misalignment between the longer side face of each layer of the holding sealing material and the end face of the exhaust gas treating body in the manufactured exhaust gas purifying apparatus.

In contrast, a shift of more than about 10 mm is a little large for a shift, and the movement distance of each layer of the holding sealing material toward the reverse direction of the press-fitting direction tends to be somewhat insufficient depending on the size of the exhaust gas treating body. This may lead to a slightly large degree of misalignment between the longer side face of each layer of the holding sealing material and the end face of the exhaust gas treating body.

On the other hand, when the shift is less than about 0.1 mm, each layer of the holding sealing material tends to move excessively toward the reverse direction of the press-fitting direction depending on the size of the exhaust gas treating body. This tends not to allow the longer side face of each layer of the holding sealing material to be substantially parallel to the end face of the exhaust gas treating body.

The method of manufacturing an exhaust gas purifying apparatus according to the embodiment of the present invention includes winding in multiple layers a mat-shaped holding sealing material including inorganic fibers around an outer peripheral portion of an exhaust gas treating body having a plurality of cells placed longitudinally in parallel with one another with a cell wall interposed therebetween, by the method of winding a holding sealing material according to the embodiments of the present invention; and press-fitting the exhaust gas treating body with the holding sealing material wound therearound into a casing, from an end face of the exhaust gas treating body on the opposite side of an inner layer exposed end face where a part of an innermost layer of the holding sealing material is exposed.

In the method of manufacturing an exhaust gas purifying apparatus according to the embodiment of the present invention, the holding sealing material is wound around the exhaust gas treating body by the method of winding a holding sealing material according to the embodiments of the present invention, and the exhaust gas treating body with the holding sealing material wound therearound is press-fitted into the casing from an end face opposite to an inner layer exposed end face where a part of the holding sealing material of an innermost layer is exposed.

Therefore, each layer of the holding sealing material tends to move toward the reverse direction of the press-fitting direction in the press-fitting process. This tends to allow a longer side face of each layer of the holding sealing material to be substantially parallel to an end face of the exhaust gas treating body in the manufactured exhaust gas purifying apparatus. As a result, an area of contact between the longer side face of the holding sealing material and exhaust gases tends to be decreased, and whereby the longer side face tend to be resistant to wind erosion.

Further, since the longer side face of the holding sealing material is not cut with a cutting jig such as a cutter, an area of a cut surface of inorganic fibers tends to be small at the longer side face of the holding sealing material in the manufactured exhaust gas purifying apparatus, which also tends to make the longer side face resistant to wind erosion.

Therefore, by the method of manufacturing an exhaust gas purifying apparatus according to the embodiment of the present invention, an exhaust gas purifying apparatus having the holding sealing material resistant to damage is more likely to be manufactured.

In the method of manufacturing an exhaust gas purifying apparatus according to the embodiment of the present invention, an exhaust gas purifying apparatus is manufactured with use of the method of winding a holding sealing material according to the embodiments of the present invention. The method according to the embodiments of the present invention eliminates the need for adjusting the angle, the shape, or the like of the inclined face by cutting each time in accordance with the sizes of the exhaust gas treating body and the holding sealing material and the need for the cutting jig such as a cutter.

Accordingly, the method of manufacturing an exhaust gas purifying apparatus according to the embodiment of the present invention tends to allow manufacturing of an exhaust gas purifying apparatus having the holding sealing material resistant to damage at high production efficiency. Further, the exhaust gas purifying apparatus is more likely to be manufactured at a low cost.

The method of manufacturing an exhaust gas purifying apparatus according to the embodiment of the present invention is desirably that, the holding sealing material further includes about 15% by weight or less of a binder.

Since the holding sealing material contains a binder, the bulk of the holding sealing material is more likely to be reduced compared with that of a holding sealing material not containing a binder. Therefore, the exhaust gas treating body with the holding sealing material wound therearound is more likely to be easily press-fitted into the casing.

Moreover, since the inorganic fibers constituting the holding sealing material are more likely to be firmly bonded to one another, scattering of the inorganic fibers in the manufacturing process is more likely to be prevented. Similarly, scattering of the inorganic fibers is more likely to be prevented in the manufactured exhaust gas purifying apparatus.

Furthermore, a binder content of about 15% by weight or less tends to lead to the minimum amount of organic components in exhaust gases to be discharged when the manufactured exhaust gas purifying apparatus is used. Therefore, a burden on the environment is more likely to be reduced.

On the other hand, a binder content of more than about 15% by weight tends to lead to an increased amount of organic components in exhaust gases to be discharged in using the holding sealing material for an exhaust gas purifying apparatus, and thus may put a burden on the environment.

First Embodiment

Hereinafter, a first embodiment of the present invention will be described with reference to drawings.

First, the structure of a holding sealing material used in the method of winding a holding sealing material of the present embodiment will be described.

Figure 8:
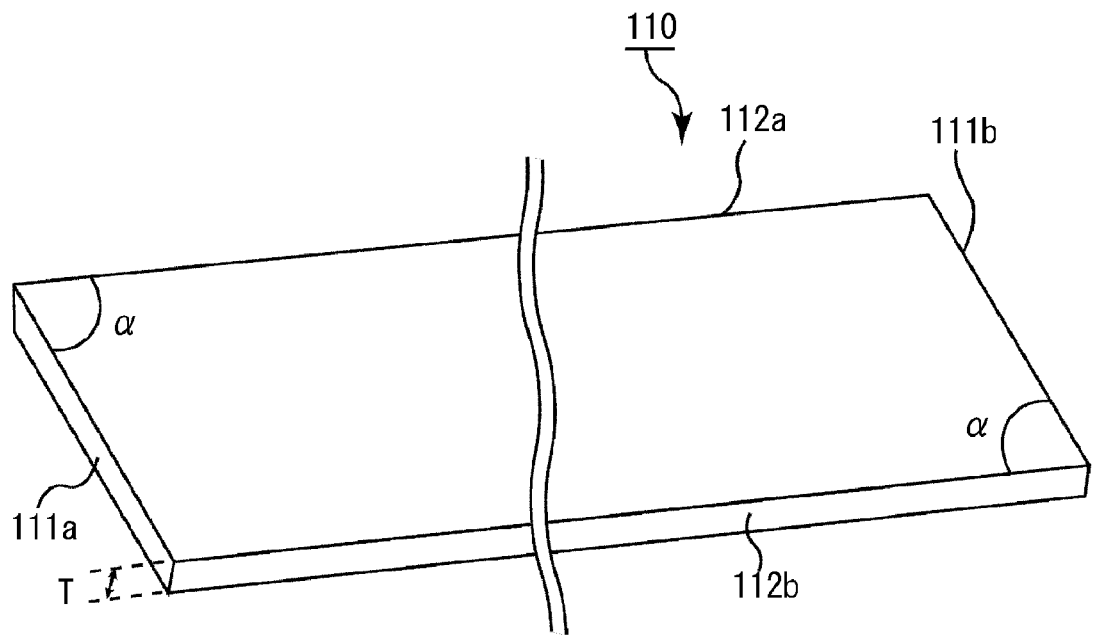
FIG. 8 is a perspective view schematically illustrating a holding sealing material of a first embodiment.

FIG. 8 is a perspective view schematically illustrating a holding sealing material of the first embodiment.

As illustrated in FIG. 8, a holding sealing material 110 used in the method of winding a holding sealing material of the present embodiment contains inorganic fibers and is mat-shaped. More specifically, the holding sealing material 110 has a shorter side face 111*a* (111*b*) and a longer side face 112*a* (112*b*) and is a parallelogram in a plan view. Moreover, an acute angle α formed by the shorter side face 111*a* (111*b*) and the longer side face 112*a* (112*b*) is about 70°≤α<about 90°. The thickness (indicated by a double-headed arrow T in FIG. 8) of the holding sealing material may be from about 1.5 mm to about 12 mm.

The inorganic fibers constituting the holding sealing material 110 are not particularly limited, and may be alumina-silica fibers, alumina fibers, silica fibers, or the like. The kinds of the inorganic fibers may be changed in accordance with characteristics such as heat resistance and wind erosion resistance required for the holding sealing material. In the case that alumina-silica fibers are used as the inorganic fibers, for example, inorganic fibers may be used in which the composition ratio of alumina to silica is from about 60:about 40 to about 80:about 20.

The holding sealing material of the present embodiment further contains about 15% by weight or less of a binder such as an acrylic resin in order to make it easier to reduce the bulk of the holding sealing material or to prevent scattering of the inorganic fibers in press-fitting of the holding sealing material into a casing.

In addition, allowing the holding sealing material to contain a binder makes it easier to suppress a frictional force in press-fitting of the holding sealing material into the casing and to enhance workability before assembling of an exhaust gas treating apparatus.

The holding sealing material is a needled mat manufactured by a needling treatment on an entire base mat containing inorganic fibers. The needling treatment refers to a process of inserting and removing a fiber entangling tool such as a needle into and from a base mat. In the holding sealing material on which the needling treatment has been performed, inorganic fibers having a comparatively long average fiber length are more likely to be three-dimensionally entangled with one another.

Here, the inorganic fibers have an average fiber length sufficient to provide an entangled structure, and for example, the average fiber length of the inorganic fibers may be from about 50 μm to about 100 mm.

Moreover, the needling treatment may be performed on a region corresponding to at least one layer of the holding sealing material.

Here, the region corresponding to one layer will be described.

For example, consider a case where the length in the longitudinal direction of the holding sealing material is about 850 mm and the length of the outer periphery of the exhaust gas treating body is about 251 mm. In this case, a region about 251 mm from one end portion toward the other end portion of the holding sealing material (region corresponding to the length of the outer periphery of the exhaust gas treating body) is a region corresponding to the first layer when the holding sealing material is wound once around the exhaust gas treating body. Further, the region wound once more around the outer peripheral portion of the exhaust gas treating body with the holding sealing material wound once therearound (wound body) is a region corresponding to the second layer. Regions corresponding to the respective third layer, fourth layer, and so forth up to an $n^{th}$ layer are determined.

Examples of an aspect having the needling treatment performed on a region corresponding to at least one layer of the holding sealing material include, in addition to the above-mentioned aspect, an aspect in which a wound body manufactured by winding the holding sealing material three times around the outer periphery of the exhaust gas treating body has the needling treatment performed on the regions corresponding to the first and the third layers and does not have the needling treatment performed on the region corresponding to the second layer; and an aspect in which a wound body manufactured by winding the holding sealing material three times around the outer periphery of the exhaust gas treating body does not have the needling treatment performed on the regions corresponding to the first and the third layers and has the needling treatment performed only on the region corresponding to the second layer.

Further, the needling treatment may be performed on the entire region corresponding to one layer, or may be performed on a part of the region corresponding to one layer.

Next, the exhaust gas treating body constituting the exhaust gas purifying apparatus of the present embodiment will be described with reference to FIG. 9A and FIG. 9B.

Figure 9A:
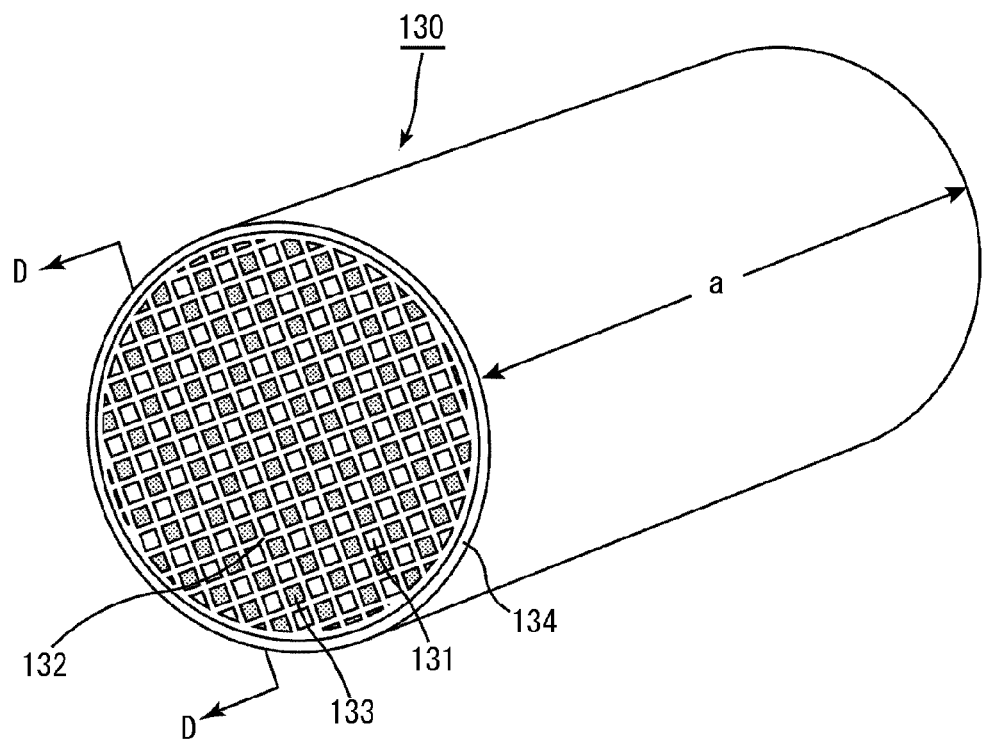
FIG. 9A is a perspective view schematically illustrating an exhaust gas treating body constituting an exhaust gas purifying apparatus of the first embodiment.

FIG. 9A is a perspective view schematically illustrating an exhaust gas treating body constituting the exhaust gas purifying apparatus of the first embodiment. FIG. 9B is a D-D line cross-sectional view of the exhaust gas treating body illustrated in FIG. 9A.

As illustrated in FIG. 9A, an exhaust gas treating body 130 is mainly made of porous ceramics and has a round pillar shape. Further, a sealing material layer (coat layer) 134 is provided on the outer periphery of the exhaust gas treating body 130 for the purpose of reinforcing or arranging the outer peripheral portion of the exhaust gas treating body 130, or improving heat-insulating property of the exhaust gas treating body 130.

Figure 9B:
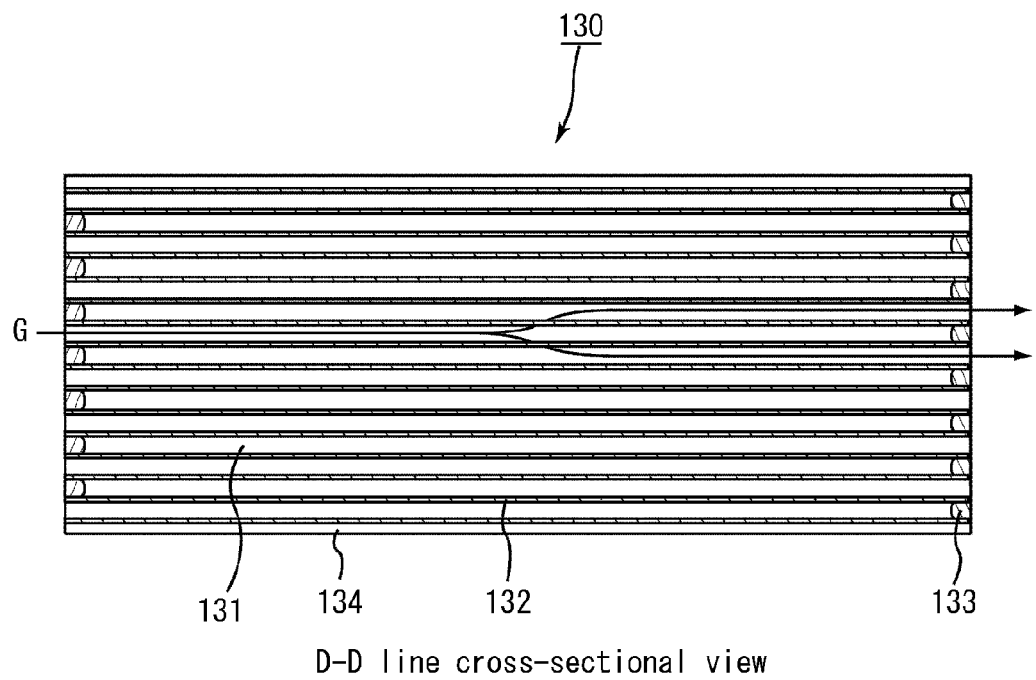
FIG. 9B is a D-D line cross-sectional view of the exhaust gas treating body illustrated in FIG. 9A.

Furthermore, as illustrated in FIG. 9B, the exhaust gas treating body 130 has a plurality of cells 131 placed in parallel with one another in the longitudinal direction (direction indicated by a double-headed arrow a in FIG. 9A). Either one end of each cell 131 is sealed with a plug 133, and thereby the exhaust gas treating body 130 functions as a filter (honeycomb filter) for purifying PM included in exhaust gases.

That is, in the exhaust gas treating body 130, exhaust gases (a flow of the exhaust gases is indicated by an arrow G in FIG. 9B) having flowed into the cell 131 sealed at an end portion on an exhaust gas outlet side surely pass through a cell wall 132 interposed between the cells 131 and flow out of the cell 131 sealed at an end portion on an exhaust gas inlet side. PM is captured at the cell wall 132 when the exhaust gases pass through the cell wall 132, and the exhaust gases are thereby purified.

In addition, the exhaust gas treating body 130 may be made of cordierite or the like and may be integrally formed as illustrated in FIG. 9A. Alternatively, the exhaust gas treating body 130 may be made of silicon carbide or the like and may be formed by binding, via an adhesive material layer mainly containing ceramics, a plurality of pillar-shaped honeycomb fired bodies which have a plurality of cells placed longitudinally in parallel with one another with a cell wall interposed therebetween.

Further, when used for the purpose of purifying toxic gas components such as CO, EC and NOx contained the exhaust gases, the exhaust gas treating body 130 may be used as a catalyst support in which the cell 131 is not sealed with the plug 133. Supporting a catalyst such as platinum on the catalyst support tends to allow the toxic gas components to be converted.

The casing constituting the exhaust gas purifying apparatus will be described with reference to FIG. 10.

Figure 10:
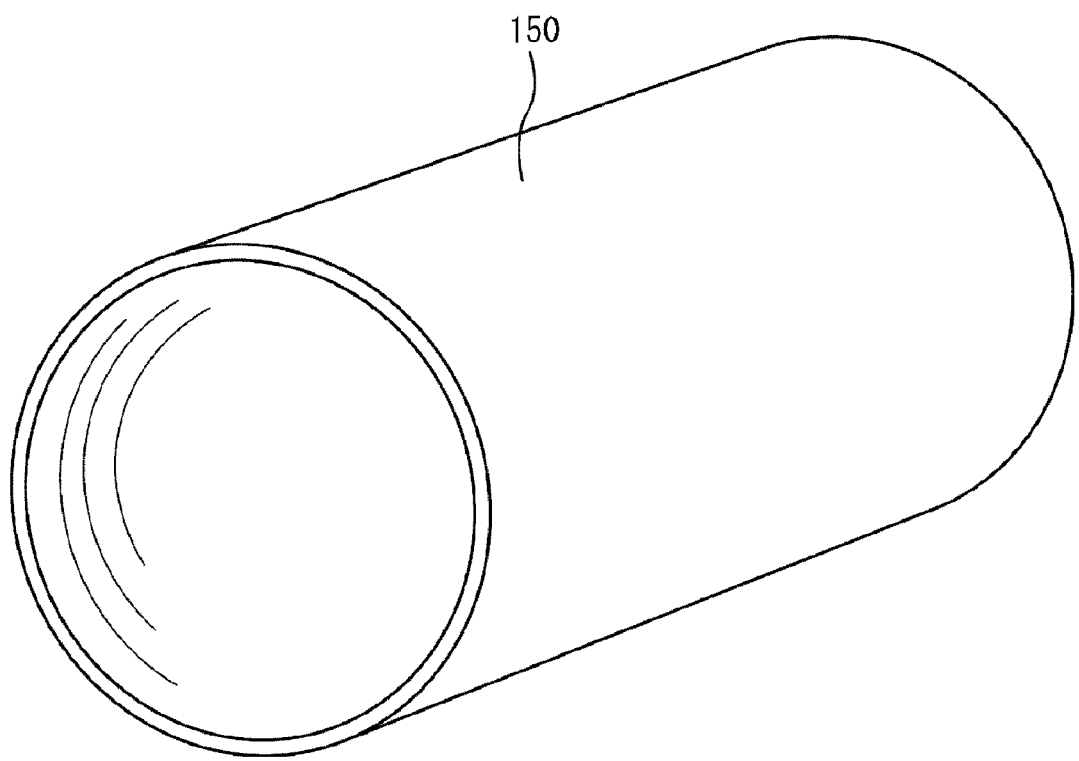
FIG. 10 is a perspective view schematically illustrating a casing constituting the exhaust gas purifying apparatus of the first embodiment.

FIG. 10 is a perspective view schematically illustrating a casing constituting the exhaust gas purifying apparatus of the first embodiment.

A casing 150 illustrated in FIG. 10 is mainly made of metal such as stainless steel, and the shape of the casing is cylindrical. Here, the inner diameter of the casing 150 is slightly smaller than the total length of the diameter of an end face of the exhaust gas treating body 130 and the thickness of a holding sealing material 110 wound around the exhaust gas treating body 130 in FIG. 9A or FIG. 9B. The length of the casing is slightly longer than the length in the longitudinal direction of the exhaust gas treating body 130.

Here, after the exhaust gas treating body and the holding sealing material are disposed in the casing 150, the respective end portions of the casing 150 may be connected, according to need, with an inlet pipe for introducing exhaust gases discharged from an internal combustion engine into the exhaust gas purifying apparatus, and an outlet pipe through which the exhaust gases having passed through the exhaust gas purifying apparatus are discharged to the outside.

The structure of the exhaust gas purifying apparatus, manufactured by a method of manufacturing an exhaust gas purifying apparatus with use of the method of winding a holding sealing material of the present embodiment, is not given here since it has been already mentioned in the description of the method of winding a holding sealing material described above (see FIG. 5B and FIG. 6).

That is, the exhaust gas purifying apparatus of the present embodiment includes: a pillar-shaped exhaust gas treating body in which a plurality of cells are longitudinally disposed in parallel with one another with a cell wall interposed therebetween; a casing configured to accommodate the exhaust gas treating body; and a holding sealing material provided between the exhaust gas treating body and the casing to hold the exhaust gas treating body. Further, the longer side face of each layer of the holding sealing material and the end face of the exhaust gas treating body are substantially parallel to each other.

In such an exhaust gas purifying apparatus, PMs in exhaust gases are more likely to be captured at the exhaust gas treating body and the exhaust gases are purified.

Hereinafter, the method of manufacturing an exhaust gas purifying apparatus with use of the method of winding a holding sealing material of the present embodiment will be described.

First, a method of manufacturing a holding sealing material will be described.

Manufacturing of Holding Sealing Material

A holding sealing material is manufactured according the following procedure.

(1) First, a needled mat is prepared as a mat constituting a holding sealing material. The needled mat may be manufactured by performing the needling treatment on an entire base mat.

The base mat has a structure in which inorganic fibers manufactured through a spinning process and having a predetermined average fiber length are loosely entangled with one another. The needling treatment on the loosely entangled inorganic fibers of the base mat tends to make the inorganic fibers entangled with one another complicatedly so that a needled mat, having an entangled structure capable of maintaining its shape to a certain degree without a binder, is more likely to be manufactured.

Here, the needling treatment may be performed with a needling device, for example. The needling device has a supporting plate for supporting a base mat, and a needle board which is disposed above the supporting plate and capable of moving in a reciprocating manner in the sticking direction (thickness direction of the base mat). The needle board has a large number of needles attached thereto. This needle board is moved relative to the base mat placed on the supporting plate, and the large number of needles are inserted into and removed from the base mat so that the inorganic fibers constituting the base mat are more likely to be entangled complicatedly.

The number of the needling treatments and the number of needles may be altered in accordance with the target bulk density, a weight per square area, and the like.

(2) Next, the needled mat is cut into a parallelogram having a predetermined acute angle in a plan view, and a predetermined amount of a binder liquid is sprayed over the cut mat so that the binder is allowed to adhere to the mat.

The binder liquid may be an emulsion prepared by dispersing a binder such as an acrylic resin into water. This binder liquid is sprayed uniformly over the entire cut mat by a spray or the like so that the binder is allowed to adhere to the mat.

(3) Thereafter, the cut mat is dried in order to remove water content in the binder liquid. At this time, the cut mat having the binder adhered thereto may be dried while being compressed according to need. The cut mat may be dried at a drying temperature of from about 95° C. to about 150° C. for from about 1 minute to about 30 minutes, for example.

Through the above-mentioned process, a holding sealing material to be used in the method of winding a holding sealing material of the present embodiment is manufactured.

The manufactured holding sealing material has a thickness of from about 1.5 mm to about 12 mm and is a parallelogram having an acute angle $\alpha$ of about $70° \leq \alpha <$ about $90°$ in a plan view. Further, the holding sealing material includes about 15% by weight or less of a binder.

A method of winding a holding sealing material with use of the holding sealing material to be manufactured through the above-mentioned processes, and a method of manufacturing an exhaust gas purifying apparatus with use of the winding method will be described.

First, one end portion of the holding sealing material is abutted on the outer peripheral portion of the round pillar-shaped exhaust gas treating body manufactured by a conventionally known method, with a first main face of the holding sealing material directed toward the exhaust gas treating body side and with a second main face directed outward. At this time, one end portion of the holding sealing material is abutted on the outer peripheral portion of the exhaust gas treating body such that a shorter side face is parallel to a straight line drawn along the longitudinal direction of the exhaust gas treating body.

This makes it easy to provide an acute angle $\beta$ of about $70° \leq \beta <$ about $90°$ in a projection view of the exhaust gas treating body and the holding sealing material projected from a direction perpendicular to the longitudinal direction of the exhaust gas treating body, the angle $\beta$ formed by a straight line drawn along the longitudinal direction of the exhaust gas treating body and a tangent line that is determined at an intersection of the straight line and a curve formed by a side face of the holding sealing material on one end face side of the exhaust gas treating body.

In this state, the holding sealing material is spirally wound around the outer peripheral portion of the exhaust gas treating body.

This tends to allow winding of the holding sealing material with each layer of the holding sealing material on the exhaust gas treating body shifted in the winding order, such that an outer layer of the holding sealing material is placed closer to one end face of the exhaust gas treating body than an inner layer of the holding sealing material, and that a shift (spiral pitch) between each inner layer and the adjacent outer layer is from about 0.15% to about 15% of a length in a width direction of the holding sealing material. That is, the holding sealing material is more likely to be spirally wound at a predetermined spiral pitch around the outer peripheral portion of the exhaust gas treating body more simply and efficiently without adjusting the position of the holding sealing material to attain a predetermined shift before winding the holding sealing material.

Next, a casing is prepared and the exhaust gas treating body with the holding sealing material wound therearound is press-fitted into the casing. At this time, the exhaust gas treating body with the holding sealing material wound therearound is press-fitted into the casing to a predetermined position, from an end face of the exhaust gas treating body on the opposite of an inner layer exposed end face where a part of the innermost layer of the holding sealing material is exposed.

An exhaust gas purifying apparatus is be manufactured through the above-mentioned processes. Here, the exhaust gas treating body with the holding sealing material wound therearound may be held by compressing with a pressing machine or the like the casing from the peripheral side so as to reduce the casing inner diameter.

In the exhaust gas purifying apparatus manufactured by the method of manufacturing an exhaust gas purifying apparatus of the present embodiment, as previously mentioned, a longer side face of each layer of the holding sealing material and an end face of the exhaust gas treating body are more likely to be substantially parallel to each other.

Further, an exhaust gas purifying apparatus having the longer side face of each layer of the holding sealing material being substantially parallel to the end face of the exhaust gas treating body is more likely to be manufactured without cutting the longer side face of the holding sealing material with a cutting jig such as a cutter in accordance with the sizes of the exhaust gas treating body and the holding sealing material.

Moreover, the exhaust gas purifying apparatus tends to have a predetermined amount of a binder contained in the holding sealing material.

Hereinafter, descriptions will be given for the effects of the method of winding a holding sealing material of the present embodiment and the method of manufacturing an exhaust gas purifying apparatus of the present embodiment with use of the method of winding a holding sealing material.

(1) In the method of winding a holding sealing material of the present embodiment, the holding sealing material is spirally wound around the outer peripheral portion of the exhaust gas treating body such that the shift (spiral pitch) is from about 0.15% to about 15% of a length in the width direction of the holding sealing material.

In the method of manufacturing an exhaust gas purifying apparatus of the present embodiment using such a method of winding a holding sealing material of the present embodiment, the longer side face of each layer of the holding sealing material and the end face of the exhaust gas treating body are more likely to be substantially parallel to each other by press-fitting the exhaust gas treating body with the holding sealing material wound therearound into the casing, from an end face of the exhaust gas treating body on the opposite side of an inner layer exposed end face where a part of the holding sealing material of the innermost layer is exposed.

Accordingly, the exhaust gas purifying apparatus manufactured by the method of manufacturing an exhaust gas purifying apparatus of the present embodiment tends to have a small area of contact between the longer side face of the holding sealing material and exhaust gases, and the longer side face tends to be resistant to wind erosion.

Furthermore, the method of winding a holding sealing material of the present embodiment does not include cutting of the longer side face of the holding sealing material into an inclined face with a cutting jig such as a cutter. Therefore, the exhaust gas purifying apparatus manufactured by the method of manufacturing an exhaust gas purifying apparatus of the present embodiment tends to have a small area of a cut surface of inorganic fibers on the longer side face of the holding sealing material, which tends to make the longer side face resistant to wind erosion.

Accordingly, by the method of manufacturing an exhaust gas purifying apparatus of the present embodiment, an exhaust gas purifying apparatus having the holding sealing material resistant to wind erosion and thus having the holding sealing material resistant to damage is more likely to be manufactured.

(2) By the method of manufacturing an exhaust gas purifying apparatus of the present embodiment, an exhaust gas purifying apparatus having the longer side face of the holding sealing material substantially parallel to the end face of the exhaust gas treating body is more likely to be manufactured without cutting of the longer side face.

This eliminates the need for a cutting jig such as a cutter in manufacturing of the exhaust gas purifying apparatus. Further, time and effort of adjusting the angle of the inclined face in accordance with the sizes of the exhaust gas treating body and the holding sealing material by cutting are more likely to be saved in manufacturing of the holding sealing material.

Accordingly, by the method of manufacturing an exhaust gas purifying apparatus of the present embodiment, an exhaust gas purifying apparatus having the holding sealing material resistant to damage is more likely to be manufactured at high production efficiency. Further, the exhaust gas purifying apparatus is more likely to be manufactured at a low cost.

(3) Further, in the method of winding a holding sealing material of the present embodiment, the holding sealing material being a parallelogram in a plan view with an acute angle $\alpha$ of about $70° \leq \alpha <$ about $90°$ is employed such that the holding sealing material tends to have a spiral pitch corresponding to from about 0.15% to about 15% of a length in the width direction of the holding sealing material when being wound with the shorter side face thereof being substantially parallel to a straight line drawn along the longitudinal direction of the exhaust gas treating body.

In the case that the holding sealing material is wound around the exhaust gas treating body, the shorter side face of the holding sealing material should be substantially parallel to the straight line drawn along the longitudinal direction of the exhaust gas treating body. This tends to allow winding of the holding sealing material around the outer peripheral portion of the exhaust gas treating body at a predetermined spiral pitch.

That is, the holding sealing material is more likely to be spirally wound around the outer peripheral portion of the exhaust gas treating body more simply and more efficiently at a predetermined spiral pitch by only winding the holding sealing material with the shorter side face of the holding sealing material being substantially parallel to the straight line drawn along the longitudinal direction of the exhaust gas treating body without adjusting the position of the holding sealing material before winding of the holding sealing material.

Winding the holding sealing material in the above way makes it easy to wind the holding sealing material around the exhaust gas treating body such that the acute angle $\beta$ is about $70° \leq \beta <$ about $90°$ in a projection view of the exhaust gas treating body and the holding sealing material projected from a direction perpendicular to the longitudinal direction of the exhaust gas treating body, the angle $\beta$ formed by a straight line drawn along the longitudinal direction of the exhaust gas treating body and a tangent line that is determined at an intersection of the straight line and a curve formed by a side face of the holding sealing material on one end face side of the exhaust gas treating body.

(4) In the holding sealing material used in the method of winding a holding sealing material of the present embodiment, a region corresponding to at least one layer is a needled mat on which a needling treatment has been performed.

The inorganic fibers constituting the holding sealing material wound around the exhaust gas treating body are complicatedly entangled with one another, and thereby the holding sealing material is resistant to wind erosion.

Accordingly, by the method of manufacturing an exhaust gas purifying apparatus of the present embodiment, an exhaust gas purifying apparatus having the holding sealing material resistant to damage is more likely to be manufactured.

(5) In the method of manufacturing an exhaust gas purifying apparatus of the present embodiment, an exhaust gas purifying apparatus is manufactured with a holding sealing material containing about 15% by weight or less of a binder.

Such a holding sealing material containing a binder makes it easier to reduce the bulk of the holding sealing material compared with that of a holding sealing material not containing a binder. This makes it easy to press-fitting the exhaust gas treating body with the holding sealing material wound therearound into a casing.

Moreover, since the inorganic fibers constituting the holding sealing material are more likely to be sufficiently bonded to one another, the inorganic fibers hardly scatter in the manufacturing process and in the manufactured exhaust gas purifying apparatus.

Furthermore, since the binder content is about 15% by weight or less, the amount of organic components in exhaust gases to be discharged is more likely to be minimized when the manufactured exhaust gas purifying apparatus is used. Therefore, a burden on the environment is more likely to be reduced.

Hereinafter, Examples are described in which the first embodiment of the present invention is more specifically disclosed. Note that the present embodiment is not limited to these Examples.

EXAMPLES

Example 1

1. Manufacturing of Holding Sealing Material

A holding sealing material was manufactured according the following procedure.

A base mat having a compounding ratio of $Al_2O_3$:$SiO_2$=72:28 was prepared as a base mat made of alumina fibers (average fiber length: 50 mm, average fiber diameter: 5.5 μm) having alumina-silica composition. A needled mat was manufactured by performing a needling treatment entirely on this base mat.

Next, the needled mat was cut to prepare a cut mat having a predetermined size and being a parallelogram in a plan view. The manufactured cut mat was impregnated with a binder liquid to allow the binder to adhere evenly to the cut mat so that the cut mat has 1.0% by weight of the binder with respect to the amount of alumina fibers therein.

As the binder liquid, an acrylic resin emulsion prepared by sufficiently dispersing an acrylic resin in water was used.

Thereafter, the cut mat with the binder adhered thereto was dried at 140° C. for five minutes to manufacture a holding sealing material having the following: dimensions in a plan view of 75 mm in shorter side length (width)×850 mm in longitudinal length (length)×5.3 mm in thickness; a parallelogram shape in a plan view with an acute angle α formed by the longer side face and the shorter side face being 89°; a bulk density of 0.15 $g/cm^3$; and a weight per square area of 600 $g/m^2$; and 1.0% by weight of the binder.

2. Manufacturing of Exhaust Gas Purifying Apparatus

An exhaust gas purifying apparatus was manufactured according to the following procedure.

An exhaust gas treating body (honeycomb filter) having a round pillar shape with a size of 80 mm (diameter)×85 mm (length) was prepared according to a conventionally known method.

Next, one end portion of the holding sealing material was abutted on the outer peripheral portion of the exhaust gas treating body with a first main face of the manufactured holding sealing material directed toward an exhaust gas treating body side and with a second main face directed outward. At this time, one shorter side face of the holding sealing material was put on the outer peripheral portion of the exhaust gas treating body such that the shorter side face of the holding sealing material is parallel to a straight line drawn along a longitudinal direction of the exhaust gas treating body.

In this state, the holding sealing material was spirally wound three times around the outer peripheral portion of the exhaust gas treating body and an end portion of the holding sealing material was fixed with a pressure-sensitive adhesive tape.

Here, each shift (spiral pitch) was determined to be 1.3% (1 mm) of a length in the width direction of the holding sealing material.

Subsequently, a metal casing with an inner diameter of 110 mm was prepared and the exhaust gas treating body with the holding sealing material wound therearound was press-fitted into the casing with use of a tapered jig. At this time, the exhaust gas treating body was press-fitted into the casing to a predetermined position from an end face on the opposite side of an inner layer exposed end face where a part of the innermost layer of the holding sealing material was exposed.

The casing was compressed by applying substantially uniform pressure to the casing from the peripheral side of the casing toward the inside with a pressing machine so that an exhaust gas purifying apparatus was manufactured.

A bulk density of the holding sealing material was 0.18 $g/cm^3$ after compressing of the casing.

Example 2

An exhaust gas purifying apparatus was manufactured in the same manner as in Example 1 except that the shift (spiral pitch) was set to 2.7% (2 mm) of a length in the width direction of the holding sealing material.

Comparative Example 1

An exhaust gas purifying apparatus was manufactured in the same manner as in Example 1 except that a holding sealing material having a size of 75 mm (width)×850 mm (length)×5.3 mm (thickness), as a holding sealing material having a rectangular shape in a plan view, was wound in multiple layers around the outer peripheral portion of the exhaust gas treating body such that the longer side face of each layer of the holding sealing material and the end face of the exhaust gas treating body are parallel to each other, that is, the shift is 0 mm.

Comparative Example 2

An exhaust gas purifying apparatus was manufactured in the same manner as in Example 1 except that the shift (spiral pitch) was set to 16% (12 mm) of a length (75 mm) in the width direction of the holding sealing material.

The misalignment of the longer side face and the wind erosion resistance of the holding sealing material were evaluated on the exhaust gas purifying apparatuses manufactured in Examples 1 and 2 and Comparative Examples 1 and 2.

(Evaluation of Misalignment)

The misalignment was evaluated according to the following procedure.

Each manufactured exhaust gas purifying apparatus was visually observed to determine whether or not the respective layers of the holding sealing material were misaligned. In the case that the layers are misaligned, the shortest distance between the longer side face of one layer of the holding sealing material and the longer side face of the adjacent outer layer of the one layer was measured to be designated as a misalignment amount. Further, the sum of the misalignment amounts of the respective layers was designed as a total misalignment amount.

Specifically, a first misalignment amount between the innermost layer of the holding sealing material and the middle layer of the holding sealing material, and a second misalignment amount between the middle layer of the holding sealing material and the outermost layer of the holding sealing material were measured in the exhaust gas purifying apparatuses manufactured in Examples 1 and 2 and Comparative Examples 1 and 2. Next, the first misalignment amount and the second misalignment amount were summed to determine the total misalignment amount.

Since the first misalignment amount, the second misalignment amount, and the total misalignment amount are believed to be substantially the same at both end portions of the exhaust gas purifying apparatus, the misalignment amount was measured only at the press-fitting side end portion of the exhaust gas purifying apparatus.

Here, each misalignment amount is expressed as "+" or "−". "+" means that an outer layer of the holding sealing material adjacent to an inner layer was off the inner layer toward the press-fitting side end portion (left side in FIG. 6) of the exhaust gas purifying apparatus. "−" means that an outer layer of the holding sealing material adjacent to an inner layer was off the inner layer toward an end portion on the opposite side of the press-fitting side end portion of the exhaust gas purifying apparatus.

(Evaluation of Wind Erosion Resistance)

The wind erosion resistance of the exhaust gas purifying apparatus was evaluated by the following method.

A holding sealing material similar to that manufactured in Example 1 was manufactured separately, and the holding sealing material was cut into three test pieces having a size of 25 mm (width)×40 mm (length).

These test pieces were piled such that the main faces thereof were in contact with one another in the vertical direction and were vertically sandwiched by a jig so that the bulk density would be 0.3 g/cm$^3$. At this time, the positions of the three test pieces were horizontally changed to have misalignment amounts that are same as the misalignment amounts and the total misalignment amount in Example 1, Example 2, or Comparative Example 1 in the above evaluation of misalignment.

The sandwiched pieces were heated to 700° C., and air was blown on one side face under the conditions of an air rate of 300 m/min; an air pressure of 0.2 MPa; and a pulse frequency of 7000 times (on/off=0.5/1.0 sec). Then, a wind erosion depth (wind erosion distance (mm)) from the side face was measured as an index of the wind erosion property of the side face due to wind pressure.

This measurement was carried out five times to determine an average value of the five measurements.

Table 1 shows the evaluation results of misalignment of Examples 1 and 2 and Comparative Examples 1 and 2, and the evaluation results of wind erosion resistance of Examples 1 and 2 and Comparative Example 1.

was off the inner layer toward an end portion on the opposite side of the press-fitting side end portion of the exhaust gas purifying apparatus.

As shown in Table 1, the exhaust gas purifying apparatuses manufactured in Examples 1 and 2 each had 3 mm or less of the first misalignment amount, the second misalignment amount, and the total misalignment amount, and the longer side face of the holding sealing material and the end face of the exhaust gas treating body were substantially parallel to each other.

In addition, in the evaluation test of wind erosion resistance with the test pieces of the holding sealing material serving as the exhaust gas purifying apparatuses manufactured in Examples 1 and 2, the wind erosion distance was as small as 5.5 mm in Example 1 and the wind erosion distance was as small as 3.0 mm in Example 2, and the holding sealing materials exhibited excellent wind erosion resistance. This is probably because the misalignment amounts of the holding sealing materials were small and thus the exposed areas of the side faces of the holding sealing materials (test piece) blown by air were small.

These results are considered to indicate that the exhaust gas purifying apparatuses manufactured in Examples 1 and 2, when used for purifying exhaust gases, can be an exhaust gas purifying apparatus having the entire holding sealing material including the longer side faces highly resistant to wind erosion and thus having the holding sealing material resistant to damage.

In addition, in Examples 1 and 2, cutting of the longer side face of the holding sealing material was unnecessary and the cutting jig such as a cutter was unnecessary. Further, there was no need for a holding sealing material in which an angle of the inclined face was adjusted by cutting in accordance with the sizes of the exhaust gas treating body and the holding sealing material. This suggests that exhaust gas purifying apparatuses having the longer side face of the holding sealing material being substantially parallel to the end face of the exhaust gas treating body at both end portions can be manufactured without causing a reduction in production efficiency or an increase in production cost in mass production.

On the other hand, the exhaust gas purifying apparatus manufactured in Comparative Example 1 had +3 mm of the

TABLE 1

|  | Shift | | Evaluation results of misalignment (note 2) | | | Evaluation results of wind erosion resistance Distance of wind erosion [mm] |
| --- | --- | --- | --- | --- | --- | --- |
|  | [mm] | % (note 1) | First misalignment amount [mm] | Second misalignment amount [mm] | Total misalignment amount [mm] |  |
| Example 1 | 1 | 1.3 | +2 | +1 | +3 | 5.5 |
| Example 2 | 2 | 2.7 | +1 | +0 | +1 | 3.0 |
| Comparative Example 1 | 0 | 0 | +3 | +2 | +5 | 7.0 |
| Comparative Example 2 | 12 | 16 | −9 | −5 | −14 | — |

(note 1) This shows a percentage of a shift (mm) when a length (75 mm) in the width direction of a holding sealing material is taken as 100.
(note 2) This shows an evaluation result at a press-fitting side end portion of an exhaust gas purifying apparatus.

Here, each misalignment amount is expressed as "+" or "−". "+" means that an outer layer of the holding sealing material adjacent to an inner layer was off the inner layer toward the press-fitting side end portion (left side in FIG. 6) of the exhaust gas purifying apparatus. "−" means that an outer layer of the holding sealing material adjacent to an inner layer first misalignment amount, +2 mm of the second misalignment amount, and +5 mm of the total misalignment amount, and the longer side face of the holding sealing material and the end face of the exhaust gas treating body were not substantially parallel to each other. Further, in the evaluation test of wind erosion resistance with the test pieces of the holding sealing material serving as the exhaust gas purifying apparatus manufactured in Comparative Example 1, the wind erosion distance was 7.0 mm, which was larger than those in Examples 1 and 2. This is probably because the misalignment amount of the holding sealing material was large and the exposed area of the side faces of the holding sealing material (test piece) blown by air was larger than those of Examples 1 and 2, Further, the exhaust gas purifying apparatus manufactured in Comparative Example 2 had −9 mm of the first misalignment amount, −5 mm of the second misalignment amount, and −14 mm of the total misalignment amount, and the longer side face of the holding sealing material and the end face of the exhaust gas treating body were not substantially parallel to each other.

Thus, the first misalignment amount, the second misalignment amount, and the total misalignment amount in Comparative Example 2 were all larger than those in Examples 1 and 2 and Comparative Example 1 and the wind erosion resistance was considered to be deteriorated. Hence, the wind erosion resistance was not evaluated.

These results are considered to indicate that the exhaust gas purifying apparatuses manufactured in Comparative Examples 1 and 2, when used for purifying exhaust gases, may possibly be damaged on the holding sealing material over time that the holding sealing material is used.

Second Embodiment

The method of winding a holding sealing material in the present embodiment is similar to that of the first embodiment except that the holding sealing material is rectangular in a plan view and is wound around the exhaust gas treating body in the same manner as in the above-mentioned method of winding a holding sealing material, in which the holding sealing material is spirally wound around the outer peripheral portion of the exhaust gas treating body.

Further, the method of manufacturing an exhaust gas purifying apparatus is similar to that of the first embodiment except that an exhaust gas purifying apparatus is manufactured with use of the method of winding a holding sealing material of the present embodiment.

The method of winding a holding sealing material of the present embodiment may be a method described in the following. The holding sealing material having a rectangular shape in a plan view is first abutted on the exhaust gas treating body such that the shorter side face of the holding sealing material is parallel to a straight line drawn along a longitudinal direction of the exhaust gas treating body. Then, in this state, the holding sealing material is wound while being pulled in the direction of the spiral winding so that a predetermined spiral pitch is provided. Since containing inorganic fibers and, according to need, a binder, the holding sealing material has flexibility. Accordingly, the holding sealing material is more likely to be wound as if to have a parallelogram shape in a plan view, by being pulled. The effect of the embodiment of the present invention can be also achieved with such a winding method.

Also in the present embodiment, the effects (1), (2), (4), and (5) described in the first embodiment can be exerted.

Third Embodiment

In the present embodiment, a holding sealing material including three small holding sealing materials (first, second, and third small holding sealing materials) having a rectangular shape in a plan view, and an exhaust gas treating body having a structure similar to that of the first embodiment are used.

The small holding sealing material has substantially the same structure as that of the holding sealing material used in the first embodiment except that a part of the structure differs from that of the first embodiment.

That is, the small holding sealing material has the same length (width) in the direction parallel to the shorter sides as that of the holding sealing material used in the first embodiment, and has a shorter length (length) in the longitudinal direction than that of the holding sealing material used in the first embodiment. Further, one shorter side face has a projected portion and the other shorter side face has a depressed portion into which the projected portion is fitted when the holding sealing material is rolled up and the two faces are abutted on each other.

Here, the number of the small holding sealing materials is not limited to three and may be appropriately changed in accordance with the sizes of the exhaust gas treating body, the casing, and the like. Further, the above projected portion and depressed portion may not be formed.

Hereinafter, the present embodiment will be described with reference to the drawings.

Figure 11A:
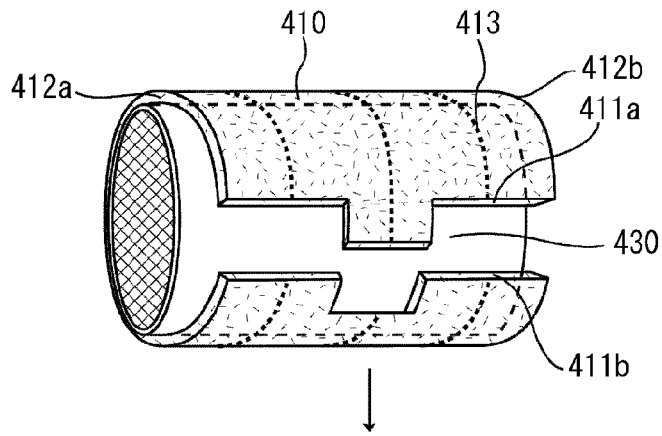
FIG. 11A is a perspective view schematically illustrating a process of winding a first small holding sealing material around the outer peripheral portion of an exhaust gas treating body.
Figure 11B:
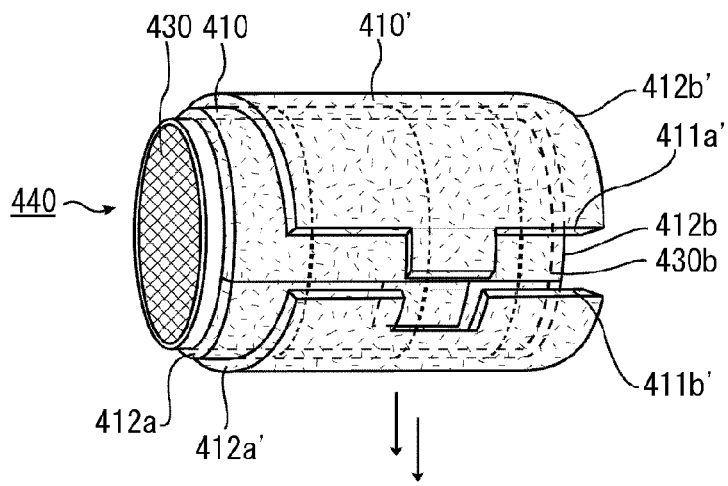
FIG. 11B is a perspective view schematically illustrating a process of winding a second small holding sealing material around the outer peripheral portion of the exhaust gas treating body with the first small holding sealing material wound therearound.
Figure 11C:
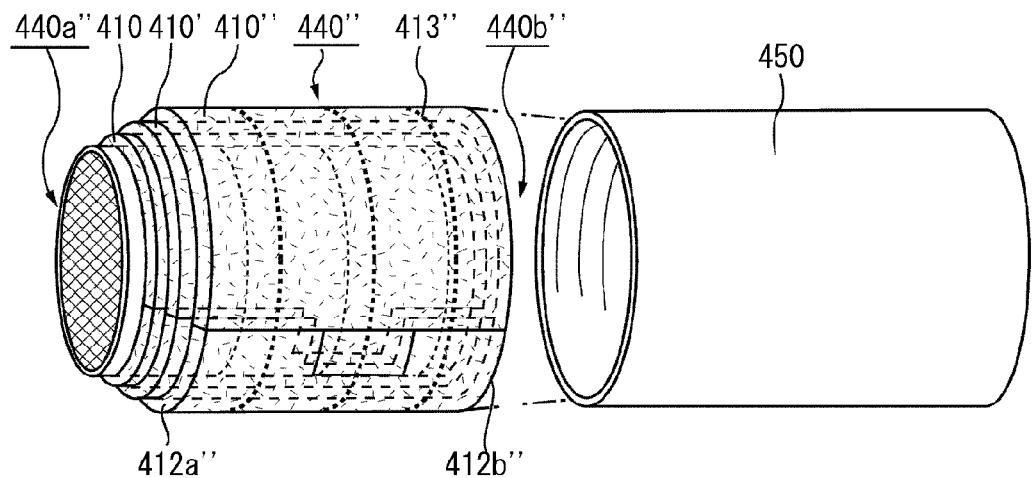
FIG. 11C is a perspective view schematically illustrating a process of press-fitting the exhaust gas treating body with the first, second, and a third small holding sealing materials wound therearound into a casing.

FIG. 11A is a perspective view schematically illustrating a process of winding a first small holding sealing material around the outer peripheral portion of the exhaust gas treating body. FIG. 11B is a perspective view schematically illustrating a process of winding a second small holding sealing material around the outer peripheral portion of the exhaust gas treating body with the first small holding sealing material wound therearound. FIG. 11C is a perspective view schematically illustrating a process of press-fitting the exhaust gas treating body with the first, second, and a third small holding sealing materials wound therearound into the casing.

First, a first small holding sealing material having substantially the same length as the peripheral length of the exhaust gas treating body is prepared (see FIG. 11A).

A first small holding sealing material 410 (small holding sealing material serving as the innermost layer) has a plurality of needle marks 413 formed along the length direction of the first small holding sealing material 410 by performing a needling treatment.

Here, the above plurality of needle marks may be formed along the width direction of the first small holding sealing material.

Next, as illustrated in FIG. 11A, the first small holding sealing material 410 is wound around the outer peripheral portion of the exhaust gas treating body 430.

At this time, the first small holding sealing material 410 is wound around the exhaust gas treating body by allowing shorter side faces 411a and 411b of the first small holding sealing material 410 to abut on each other to fit a projected portion into a depressed portion, whereby a first wound body 440 is manufactured. The first wound body 440 is wound without a gap, by the first small holding sealing material 410 having the projected portion being fitted into the depressed portion.

Subsequently, a second small holding sealing material 410' having a structure similar to that of the first small holding sealing material 410 except for having substantially the same length as the peripheral length of the first wound body 440 is prepared (see FIG. 11B).

In FIG. 11B, the needle marks 413 are not formed in the second small holding sealing material 410'.

Here, the second small holding sealing material may or may not have a plurality of needle marks formed therein. In the case that needle marks are to be formed, a plurality of needle marks may be formed along the width direction of the second small holding sealing material, or a plurality of needle marks may be formed along the length direction of the second small holding sealing material.

The second small holding sealing material 410' is wound around the outer peripheral face of the first small holding sealing material 410 such that shorter side faces 411a', 411b' of the second small holding sealing material 410' abut on each other as illustrated in FIG. 11B.

At this time, the second small holding sealing material 410' is shifted toward one end face 430b of the exhaust gas treating body 430 when wound around the exhaust gas treating body 430 such that the shift between a longer side face 412a (412b) of the first small holding sealing material 410 and a longer side face 412a' (412b') of the second small holding sealing material 410' is from about 0.15% to about 15% of a length in the width direction of the first small holding sealing material 410.

Then, a similar procedure is repeated and three small holding sealing materials 410, 410', and 410" are wound around the outer peripheral portion of the exhaust gas treating body 430, whereby a third wound body 440" is manufactured.

The third small holding sealing material 410" (small holding sealing material serving as the outermost layer) has a plurality of needle marks 413" formed along the length direction of the third small holding sealing material 410" by performing a needling treatment.

The above plurality of needle marks may be formed along the width direction of the third small holding sealing material.

In the present embodiment, description has been given on the method of manufacturing the third wound body 440" by winding the three small holding sealing materials 410, 410', and 410" in the stated order around the outer peripheral portion of the exhaust gas treating body 430. The three small holding sealing materials 410, 410', and 410" may be coupled to one another in advance so as to have a predetermined shift, and the coupled body of the three small holding sealing materials 410, 410', and 410" may be wound around the exhaust gas treating body 430 by one operation or by plural operations.

The method of coupling the small holding sealing materials to one another is not particularly limited as long as the method does not interfere with the movement of each layer of the holding sealing material toward the reverse direction of the press-fitting direction in a subsequent press-fitting process. Examples of the method include a method of coupling the small holding sealing materials to one another with a pressure-sensitive adhesive tape or the like.

Next, a casing 450 having a structure similar to that of the first embodiment is prepared and the third wound body 440" is press-fitted into the casing 450, so that an exhaust gas purifying apparatus is manufactured.

At this time, as illustrated in FIG. 11C, the third wound body 440" is press-fitted into the casing 450 to a predetermined position, from an end face 440b" of the third wound body 440" on the opposite side of an inner layer exposed end face 440a".

The manufactured exhaust gas purifying apparatus thereby manufactured tends to have the longer side faces 412a, 412a', and 412a" (412b, 412b', and 412b") of the small holding sealing materials 410, 410', and 410" which are substantially parallel to the end face of the exhaust gas treating body 430, similarly to the exhaust gas purifying apparatus manufactured with use of the method of winding a holding sealing material according to the first embodiment (see FIG. 6).

Since the exhaust gas purifying apparatus manufactured with use of the method of winding a holding sealing material of the present embodiment tends to have the longer side face of the holding sealing material substantially parallel to the end face of the exhaust gas treating body 430, the effects (1), (2), (4), and (5) described in the first embodiment can be exerted.

Further, the following effects (6) and (7) can be exerted.

(6) In winding the small holding sealing material around the exhaust gas treating body, the position of each of the small holding sealing materials 410, 410', and 410" is more likely to be separately adjusted.

Accordingly, it is easy to wind the holding sealing material around the exhaust gas treating body such that the shift is from about 0.15% to about 15% of a length in the width direction of the holding sealing material, compared to a case where one sheet of holding sealing material is spirally wound around the exhaust gas treating body.

(7) At least the small holding sealing material serving as the innermost layer and the small holding sealing material serving as the outermost layer have a plurality of needle marks formed along the length direction of the small holding sealing material. Accordingly, the small holding sealing material and the exhaust gas treating body hardly come off the casing.

The reason for this is not clear, however, the following reason is presumable.

When a needling treatment is performed on the holding sealing material, needle marks are formed at a location to and from which the needle is inserted and removed. In the vicinity of the needle marks, inorganic fibers are more likely to be entangled and thus the bulk is more likely to be reduced compared with other locations.

Accordingly, the needle marks formed along a specific direction (this is referred to as a needle mark formation direction) tend to define a kind of groove formed along the needle mark formation direction.

This leads to an assumption that, when the holding sealing material is moved along the needle mark formation direction, frictional resistance generating between the holding sealing material and a component in contact with the holding sealing material tends to be small and the holding sealing material is easily moved.

In contrast, when the holding sealing material is moved perpendicularly to the needle mark formation direction, the assumption is that frictional resistance generating between the holding sealing material and the component in contact with the holding sealing material tends to be large and the holding sealing material is hardly moved.

There may be concern that the pressure of exhaust gases to be applied to the manufactured exhaust gas purifying apparatus can be pressure applied in the direction perpendicular to the needle marks 413" formation direction, moving the small holding sealing material 410" of the outermost layer to this direction and thereby leading to coming off of the layer from the casing 450 (see FIG. 11).

However, since the small holding sealing material 410" serving as the outermost layer has a plurality of needle marks 413" formed along the length direction thereof, frictional resistance generating between the small holding sealing material 410" serving as the outermost layer and the casing 450 in contact with the small holding sealing material 410" is comparatively large.

Therefore, the small holding sealing material 410" serving as the outermost layer hardly comes off the casing 450.

Further, the small holding sealing material 410 serving as the innermost layer has a plurality of needle marks 413 formed along the length direction thereof.

In the manufactured exhaust gas purifying apparatus, frictional resistance generating between the small holding sealing material 410 and the exhaust gas treating body 430 is comparatively large.

Accordingly, the exhaust gas treating body 430 is held securely by the holding sealing material, and hardly comes off the casing 450.

Note that the small holding sealing material serving as the innermost layer may have a plurality of needle marks formed along the width direction thereof, and the small holding sealing material serving as the outermost layer may have a plurality of needle marks formed along the length direction thereof. Moreover, the small holding sealing materials serving as the innermost layer and the outermost layer may have a plurality of needle marks formed along the respective width directions thereof.

When the small holding sealing material serving as the outermost layer has a plurality of needle marks formed along the width direction thereof, frictional resistance between the outermost layer and the casing in press-fitting the wound body into the casing is comparatively small. Therefore, an exhaust gas purifying apparatus is more likely to be easily manufactured.

Further, when the small holding sealing material serving as the innermost layer has a plurality of needle marks formed along the width direction thereof, frictional resistance between the innermost layer and the exhaust gas treating body is comparatively small, and therefore the misalignment of the press-fitted exhaust gas treating body is more likely to be appropriately corrected.

The needle mark formation direction may be appropriately selected in accordance with an object, for example, a main object of preventing coming off of the exhaust gas treating body or the like, or a main object of easily manufacturing an exhaust gas purifying apparatus.

Other Embodiments

In the method of winding a holding sealing material according to the embodiment of the present invention, the shift between an inner layer of the holding sealing material and the adjacent outer layer of the holding sealing material on the outer side of the inner layer may be the same or different from layer to layer as long as the shift is within the range of from about 0.15% to about 15% of a length in the width direction of the holding sealing material.

In order to change the shift between layers of the holding sealing material at the inner layer exposed end face and the opposite end face of the inner layer exposed end face, for example, the holding sealing material of the first embodiment illustrated in FIG. 8 may have one acute angle α different from the other acute angle α.

Examples of a method of manufacturing such a holding sealing material include a method of cutting a needled mat into a desired shape.

Further, the shift is preferably from about 0.1 mm to about 10 mm.

The shift of from about 0.1 mm to about 10 mm tends to allow a shift of the holding sealing material on a wound body to be from about 0.1 mm to about 10 mm after the completion of winding of the holding sealing material.

If such a wound body is press-fitted into the casing from an end face on the opposite side of an inner layer exposed end face, each layer of the holding sealing material tends to move toward the reverse direction of the press-fitting direction, and the movement distance of each layer of the holding sealing material tends to be in good agreement with the shift (at the $n^{th}$ layer (n is 2 or more), the total shift of the shifts from the first layer to the $n^{th}$ layer). This tends to lead to a very small misalignment amount between the longer side face of each layer of the holding sealing material and the end face of the exhaust gas treating body in the manufactured exhaust gas purifying apparatus.

Moreover, the shift is more preferably from about 0.5 mm to about 3 mm (if the length in the width direction of the holding sealing material is about 75 mm, the shift is from about 0.7% to about 4% of the length), and extremely preferably from about 1 mm to about 2 mm (if the length in the width direction of the holding sealing material is about 75 mm, the shift is from about 1.3% to about 2.7% of the length).

As described above, the shape in a plan view of the holding sealing material in the method of winding a holding sealing material according to the embodiment of the present invention is preferably a parallelogram with an acute angle α of about $70° \leq α <$ about $90°$, and more preferably a parallelogram with an acute angle α of about $85° \leq α <$ about $90°$.

If the acute angle α is about $85° \leq α <$ about $90°$, the holding sealing material is more likely to be spirally wound around the exhaust gas treating body easily and efficiently at a predetermined spiral pitch, as in the case where the acute angle α is about $70° \leq α <$ about $90°$. In addition, when the holding sealing material is wound in multiple layers around the exhaust gas treating body, the holding sealing material hardly twists, and thus a gap is hardly generated between the holding sealing material and the exhaust gas treating body.

Therefore, a gap between the exhaust gas treating body and the casing is more likely to be completely filled with the holding sealing material in the exhaust gas purifying apparatus manufactured with use of the holding sealing material, and the leakage of exhaust gases tends not to occur.

In the method of using a holding sealing material according to the embodiment of the present invention, a needling treatment is preferably performed on a region corresponding to at least one layer of the holding sealing material, as described above, but the needling treatment may not be performed.

In the method of using a holding sealing material according to the embodiment of the present invention, the region corresponding to at least one layer of the holding sealing material may be a ceramic fiber mat manufactured from a slurry containing inorganic fibers by a papermaking technique.

The method of manufacturing a ceramic fiber mat is not particularly limited, and a ceramic fiber mat may be manufactured through the following processes (1-1) to (1-4).

(1-1) Mixture Preparing Process

Inorganic fibers, an organic binder, an inorganic binder, and water are stirred by a stirrer to prepare a mixture.

Specifically, for example, the mixture is prepared by putting about 594 g of inorganic fibers, about 36 g of an organic binder, about 4.8 g of an inorganic binder, and water together such that the inorganic fiber content in the mixture will be about 0.5% by weight, and then stirring the resulting product for about 60 seconds by a stirrer.

(1-2) Sheet-Forming Process

Next, the mixture is poured into a forming tank provided with a mesh for filtration at the bottom, and then water in the mixture is dehydrated through the mesh so that a precursor of a ceramic fiber mat is prepared.

(1-3) Hot-Pressing Process

The precursor of a ceramic fiber mat is hot-pressed under the predetermined condition to manufacture a ceramic fiber mat body having a predetermined bulk density. Through this process, the inorganic fibers are fixed to one another via the organic binder and the inorganic binder, which maintains the shape of the ceramic fiber mat body.

The predetermined condition may be, for example, hot-pressing at about 120° C. for about 30 minutes.

(1-4) Cutting Process

A holding sealing material including the ceramic fiber mat having a predetermined size is manufactured by cutting the ceramic fiber mat body.

Here, a holding sealing material including the needled mat and the ceramic fiber mat may be manufactured by combining the needled mat described in the first embodiment with the ceramic fiber mat.

As the inorganic fiber, inorganic fiber with the same composition as that of the inorganic fiber constituting the above holding sealing material of the first embodiment may be used.

The average fiber length of the inorganic fibers is not particularly limited, and the average fiber length is preferably from about 30 μm to about 120 mm, and more preferably from about 50 μm to about 100 mm.

Also, the average fiber diameter of the inorganic fibers is not particularly limited, and the average fiber diameter is preferably from about 2 μm to about 12 μm, and more preferably from about 3 μm to about 10 μm.

Examples of the organic binder include acrylic resins; rubbers such as acrylic rubber; water-soluble organic polymers such as carboxymethyl cellulose and polyvinyl alcohol; thermoplastic resins such as styrene resin; and thermosetting resins such as epoxy resin.

Among these, acrylic rubber, acrylonitrile-butadiene rubber, and styrene-butadiene rubber are particularly preferable.

Further, the amount of the organic binder to be blended is preferably about 15% by weight or less with respect to the total amount of the inorganic fiber, the organic binder, and the inorganic binder.

Examples of the inorganic binder include alumina sol and silica sol.

The amount of the inorganic binder to be blended is not particularly limited as long as the binder can bond the inorganic fibers to one another. Further, the inorganic binder may not be contained in a mixture.

When the holding sealing material is wound by the method of winding a holding sealing material according to the embodiment of the present invention, the holding sealing material may be one sheet of holding sealing material described above, or may be a holding sealing material including a plurality of small holding sealing materials bonded to one another.

Examples of the holding sealing material including a plurality of small holding sealing materials include a long (corresponding to three layers) holding sealing material in which the shorter side face 411$b$ of the small holding sealing material 410 described in the third embodiment is bonded to the shorter side face 411$a'$ of another small holding sealing material 410', and the shorter side face 411$b'$ of the small holding sealing material 410' is bonded to a shorter side face 411$a''$ of still another small holding sealing material 410" (see FIG. 11).

The method of bonding the shorter side faces to each other is not particularly limited, and examples of the method include a method of sewing the vicinities of the shorter side faces together with a sewing machine, and a method of bonding the shorter side faces to each other with a pressure-sensitive adhesive tape or an adhesive.

Here, the holding sealing material including the plurality of small holding sealing materials may be a long holding sealing material in which the longer side face 412$b$ of the small holding sealing material 410 described in the third embodiment is bonded to the longer side face 412$a'$ of another small holding sealing material 410', and the longer side face 412$b'$ of the small holding sealing material 410' is bonded to the longer side face 412$a''$ of still another small holding sealing material 410" (see FIG. 11).

In the method of winding a holding sealing material according to the embodiment of the present invention, the number of windings of the holding sealing material around the exhaust gas treating body is not particularly limited. For example, when a diameter of a round pillar-shaped exhaust gas treating body is about 80 mm and a thickness of a holding sealing material is about 3.5 mm, the holding sealing material may be wound from about three times to about five times around the exhaust gas treating body.

In the method of winding a holding sealing material according to the embodiment of the present invention, the direction of winding the holding sealing material around the exhaust gas treating body is not particularly limited when the holding sealing material is spirally wound. The holding sealing material may be wound clockwise, or may be wound counterclockwise.

In the method of winding a holding sealing material according to the embodiment of the present invention, when the holding sealing material is spirally wound, the outermost layer of the holding sealing material and the adjacent inner layer of the outermost layer may be fixed with a fixing member after the completion of winding. When a plurality of small holding sealing materials separated from one another are wound, parts of the small holding sealing material each including a shorter side face may be fixed to one another with a fixing member.

Fixing the parts to one another with a fixing member makes it easy to maintain a state where the holding sealing material is wound around the exhaust gas treating body, improving a handling property of the exhaust gas treating body in the press-fitting process into the casing.

The fixing member is not particularly limited, and examples thereof include a pressure-sensitive adhesive tape.

In the holding sealing material according to the method of winding a holding sealing material according to the embodiment of the present invention, the average fiber length of inorganic fibers is preferably from about 30 μm to about 120 mm, and more preferably from about 50 μm to about 100 mm.

In the holding sealing material according to the method of winding a holding sealing material according to the embodiment of the present invention, the average fiber diameter of inorganic fibers is preferably from about 2 μm to about 12 μm, and more preferably from about 3 μm to about 10 μm.

The binder content in the holding sealing material according to the method of winding a holding sealing material according to the embodiment of the present invention is preferably about 15% by weight or less, more preferably from about 0.5% by weight to about 15% by weight, and still more preferably from about 1% by weight to about 10% by weight.

A binder content of about 0.5% by weight or more tends not to lead to a too small bulk density of the holding sealing material, which tends not to deteriorate the press-fitting ability of the holding sealing material into the casing. Moreover, the inorganic fibers are more likely to be sufficiently bonded to one another because the binder content is not too small, and therefore the inorganic fibers are less likely to be scattered. On the other hand, a binder content of about 15% by weight or less tends not to lead to an increased amount of organic components in exhaust gases to be discharged in using the holding sealing material for an exhaust gas purifying apparatus, and thus tends not to put a burden on the environment.

When the holding sealing material is spirally wound around the exhaust gas treating body by the method of winding a holding sealing material according to the embodiment of the present invention, a length of the holding sealing material is not particularly limited as long as the length is sufficiently longer than that of the outer periphery of the exhaust gas treating body so that the holding sealing material can be wound in multiple layers around the outer peripheral portion of the exhaust gas treating body. The holding sealing material preferably has such a length that a shorter side face of the outermost layer on a finish side of winding substantially exactly overlaps a position corresponding to a shorter side face of the innermost layer on a start side of winding. This makes it easier to make the thickness of the holding sealing material wound in multiple layers uniform, and the exhaust gas treating body with the holding sealing material wound therearound is more likely to be easily press-fitted. Moreover, in an exhaust gas purifying apparatus, a holding force of the holding sealing material hardly varies, and thus the exhaust gas treating body is more likely to be maintained more securely.

The thickness of the holding sealing material according to the method of winding a holding sealing material according to the embodiment of the present invention is preferably from about 1.5 mm to about 15 mm, and more preferably from about 2.0 mm to about 12 mm.

A thickness of the holding sealing material of about 15 mm or less tends not to be too large and not to deteriorate a handling property of the holding sealing material in winding.

On the other hand, a thickness of the holding sealing material of about 1.5 mm or more tends not to be too small and also not to deteriorate the strength of the holding sealing material itself.

The weight per square area of the holding sealing material according to the method of winding a holding sealing material according to the embodiment of the present invention is not particularly limited, and is preferably from about 200 g/m$^2$ to about 3000 g/m$^2$, and more preferably from about 400 g/m$^2$ to about 1900 g/m$^2$.

Moreover, the bulk density of the holding sealing material is not particularly limited either, and is preferably from about 0.10 g/cm$^3$ to about 0.30 g/cm$^3$.

The binder used for manufacturing the holding sealing material according to the method of winding a holding sealing material according to the embodiment of the present invention is not limited to the above acrylic resin, and may be, for example, rubbers such as acrylic rubber; water-soluble organic polymers such as carboxymethyl cellulose and polyvinyl alcohol; thermoplastic resins such as styrene resin; and thermosetting resins such as epoxy resin. Among these, acrylic rubber, acrylonitrile-butadiene rubber, and styrene-butadiene rubber are particularly preferable.

A binder liquid to be used for manufacturing of the holding sealing material according to the method of winding a holding sealing material according to the embodiment of the present invention may contain plural kinds of the above binders.

Moreover, the binder liquid is not limited to an emulsion prepared by dispersing the above binders in water, and may be a solution formed by dissolving the above binders in water or an organic solvent.

The binder liquid may further contain an inorganic binder. Examples of the inorganic binder include alumina sol and silica sol. Since the inorganic binder is also more likely to bond inorganic fibers to one another similarly to an organic binder, the shape of the holding sealing material is more likely to be maintained.

The shape of an exhaust gas treating body constituting the exhaust gas purifying apparatus according to the method of manufacturing an exhaust gas purifying apparatus according to the embodiment of the present invention is not particularly limited as long as the shape is a pillar shape, and the shape may be any alternative shape such as a cylindroid shape or a square pillar shape, of any size.

The material of the casing constituting the exhaust gas purifying apparatus according to the method of manufacturing an exhaust gas purifying apparatus according to the embodiment of the present invention is not particularly limited as long as the material is a metal having heat resistance. Specific examples of the material include metals such as stainless steel, aluminum, and iron.

The catalyst may be supported on the exhaust gas treating body constituting the exhaust gas purifying apparatus according to the method of manufacturing an exhaust gas purifying apparatus according to the embodiment of the present invention in order to decrease combustion temperature of PMs or convert toxic gas components in exhaust gases. Examples of the catalyst include noble metals such as platinum, palladium, and rhodium; alkali metals such as potassium and sodium; alkaline earth metals such as barium; and metal oxides. These catalysts may be used alone, or two or more of these may be used in combination.

Further, the metal oxides are not particularly limited as long as they can decrease combustion temperature of PMs or can convert toxic gas components in exhaust gases. Examples thereof include $CeO_2$, $ZrO_2$, $FeO_2$, $Fe_2O_3$, $CuO$, $CuO_2$, $Mn_2O_3$, $MnO$, and complex oxides represented by the composition formula $A_nB_{1-n}CO_3$ (wherein A represents La, Nd, Sm, Eu, Gd, or Y; B represents an alkali metal or an alkaline earth metal; C represents Mn, Co, Fe, or Ni; and $0 \leq n \leq 1$).

These metal oxides may be used alone, or two or more of these may be used in combination, but the metal oxide preferably contains at least $CeO_2$.

Supporting such a metal oxide on the exhaust gas treating body makes it easier to decrease combustion temperature of PMs, or convert toxic gas components in exhaust gases.

Examples of a method of supporting a catalyst on the exhaust gas treating body include a method in which the exhaust gas treating body is impregnated with a solution including a catalyst and is then heated; and a method in which a catalyst-supporting layer made of an alumina film is formed on the surface of the exhaust gas treating body and then a catalyst is supported on the alumina film.

Examples of a method of forming an alumina film include a method in which the exhaust gas treating body is impregnated with a solution of a metal compound containing aluminum such as $Al(NO_3)_3$ and is then heated; and a method in which the exhaust gas treating body is impregnated with a solution including alumina powders and is then heated.

Moreover, examples of a method of supporting a catalyst on an alumina film include a method in which the exhaust gas treating body having an alumina film formed thereon is impregnated with a solution including a noble metal, an alkali metal, an alkaline earth metal, or a metal oxide, and is then heated.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method of winding a holding sealing material, comprising:
   providing a mat-shaped holding sealing material comprising inorganic fibers;

providing an exhaust gas treating body having cell walls extending along a longitudinal direction of the exhaust gas treating body to define cells; and winding the mat-shaped holding sealing material around an outer peripheral portion of the exhaust gas treating body to form multiple layers including a first layer and a second layer wound around the first layer to contact the first layer, each of the multiple layers being shifted along the longitudinal direction in a winding order such that the first layer of the multiple layers is placed closer to one end face of the exhaust gas treating body than the second layer of the multiple layers, a shift between the first layer and the second layer being from about 0.15% to about 15% of a length in a width direction of said holding sealing material, wherein said holding sealing material, in a plan view, comprises a parallelogram with an acute angle α being about 70°≦α<about 90°, and wherein said holding sealing material is wound around the exhaust gas treating body such that one side face of said holding sealing material is substantially parallel to a straight line drawn along a longitudinal direction of the exhaust gas treating body.

2. The method of winding a holding sealing material according to claim 1,
wherein said holding sealing material is helically wound around the exhaust gas treating body.

3. The method of winding a holding sealing material according to claim 2,
wherein said holding sealing material has such a length that a shorter side face of an outermost layer on a finish side of said wound holding sealing material substantially overlaps a position corresponding to a shorter side face of an innermost layer on a start side of said holding sealing material.

4. The method of winding a holding sealing material according to claim 1, wherein the acute angle α is about 85°≦α<about 90°.

5. The method of winding a holding sealing material according to claim 1,
wherein said holding sealing material is wound around the exhaust gas treating body such that an acute angle β is about 70°≦β<about 90° in a projection view of the exhaust gas treating body and said holding sealing material projected from a direction perpendicular to the longitudinal direction of the exhaust gas treating body, the angle β being formed by a straight line drawn along the longitudinal direction of the exhaust gas treating body and a tangent line that is determined at an intersection of the straight line and a curve formed by a side face of said holding sealing material on one end face side of the exhaust gas treating body.

6. The method of winding a holding sealing material according to claim 1,
wherein a region of said holding sealing material corresponding to at least one layer of the multiple layers comprises a needled mat treated with a needling treatment.

7. The method of winding a holding sealing material according to claim 1,
wherein a region of said holding sealing material corresponding to at least one layer of the multiple layers comprises a ceramic fiber mat manufactured from a mixture containing inorganic fibers by a mixture preparing process a sheet-forming process, a hot-pressing process, and a cutting process.

8. The method of winding a holding sealing material according to claim 1,
wherein said holding sealing material comprises a plurality of separate holding sealing material sections.

9. The method of winding a holding sealing material according to claim 8,
wherein one separate holding sealing material section, among the plurality of separate holding sealing material sections, that serves as an innermost layer and another separate holding sealing material section, among the plurality of separate holding sealing material sections, that serves as an outermost layer have a plurality of needle marks formed by a needling treatment.

10. The method of winding a holding sealing material according to claim 9,
wherein the plurality of needle marks are aligned along a circumferential direction of the exhaust gas treating body on the one holding sealing material section and the another holding sealing material section.

11. The method of winding a holding sealing material according to claim 1,
wherein said holding sealing material comprises a plurality of separate holding sealing material sections bound to one another.

12. The method of winding a holding sealing material according to claim 1,
wherein the shift is from about 0.1 mm to about 10 mm.

13. The method of winding a holding sealing material according to claim 1,
wherein the shift is from about 0.5 mm to about 3 mm.

14. The method of winding a holding sealing material according to claim 1,
wherein the shift is from about 1 mm to about 2 mm.

15. The method of winding a holding sealing material according to claim 1, further comprising, after winding the mat-shaped holding sealing material, fixing an outermost layer and an adjacent inner layer with a fixing member.

16. The method of winding a holding sealing material according to claim 1,
wherein the inorganic fibers comprise at least one of alumina-silica fibers, alumina fibers, and silica fibers.

17. The method of winding a holding sealing material according to claim 1,
wherein an average fiber length of the inorganic fibers is from about 30 μm to about 120 mm.

18. The method of winding a holding sealing material according to claim 1,
wherein an average fiber diameter of the inorganic fibers is from about 2 μm to about 12 μm.

19. The method of winding a holding sealing material according to claim 1,
wherein said holding sealing material further comprises about 15% by weight or less of a binder.

20. The method of winding a holding sealing material according to claim 1,
wherein said holding sealing material further comprises from about 0.5% by weight to about 15% by weight of a binder.

21. The method of winding a holding sealing material according to claim 19,
wherein the binder comprises at least one of acrylic rubber, acrylonitrile-butadiene rubber, and styrene-butadiene rubber.

22. The method of winding a holding sealing material according to claim 19,
wherein the binder comprises an inorganic binder.

23. The method of winding a holding sealing material according to claim 1,
wherein a thickness of said holding sealing material is from about 1.5 mm to about 15 mm.

24. The method of winding a holding sealing material according to claim 1,
wherein a weight per square area of said holding sealing material is from about 200 g/m$^2$ to about 3000 g/m$^2$.

25. A method of manufacturing an exhaust gas purifying apparatus, comprising:
providing a mat-shaped holding sealing material comprising inorganic fibers;
providing an exhaust gas treating body having cell walls extending along a longitudinal direction of the exhaust gas treating body to define cells;
winding the mat-shaped holding sealing material around an outer peripheral portion of the exhaust gas treating body to form multiple layers including a first layer and a second layer wound around the first layer to contact the first layer, each of the multiple layers being shifted along the longitudinal direction in a winding order such that the first layer of the multiple layers is placed closer to one end face of the exhaust gas treating body than the second layer of the multiple layers, a shift between the first layer and the second layer being from about 0.15% to about 15% of a length in a width direction of the holding sealing material; and
press-connecting the exhaust gas treating body with the holding sealing material wound around the exhaust gas treating body into a casing, from an end face of the exhaust gas treating body on an opposite side of an inner layer exposed end face where a part of an innermost layer of the holding sealing material is exposed,
wherein said holding sealing material, in a plan view, comprises a parallelogram with an acute angle α being about 70°≦α<about 90°, and
wherein said holding sealing material is wound around the exhaust gas treating body such that one side face of said holding sealing material is substantially parallel to a straight line drawn along a longitudinal direction of the exhaust gas treating body.

26. The method of manufacturing an exhaust gas purifying apparatus according to claim 25,
wherein the holding sealing material further comprises about 15% by weight or less of a binder.

27. The method of manufacturing an exhaust gas purifying apparatus according to claim 25,
wherein the holding sealing material further comprises from about 0.5% by weight to about 15% by weight of a binder.

28. The method of manufacturing an exhaust gas purifying apparatus according to claim 26,
wherein the binder comprises at least one of acrylic rubber, acrylonitrile-butadiene rubber, and styrene-butadiene rubber.

29. The method of manufacturing an exhaust gas purifying apparatus according to claim 26,
wherein the binder comprises an inorganic binder.

30. The method of winding a holding sealing material according to claim 20,
wherein the binder comprises at least one of acrylic rubber, acrylonitrile-butadiene rubber, and styrene-butadiene rubber.

31. The method of winding a holding sealing material according to claim 20,
wherein the binder comprises an inorganic binder.

32. The method of manufacturing an exhaust gas purifying apparatus according to claim 27,
wherein the binder comprises at least one of acrylic rubber, acrylonitrile-butadiene rubber, and styrene-butadiene rubber.

33. The method of manufacturing an exhaust gas purifying apparatus according to claim 27,
wherein the binder comprises an inorganic binder.

* * * * *